United States Patent
Kinoshita et al.

(10) Patent No.: US 9,299,973 B2
(45) Date of Patent: Mar. 29, 2016

(54) BATTERY MODULE, ASSEMBLED BATTERY, AND VEHICLE INCLUDING THESE BATTERIES

(75) Inventors: Takuya Kinoshita, Yokosuka (JP); Hideaki Horie, Yokosuka (JP); Osamu Shimamura, Yokohama (JP); Kenji Hosaka, Yokosuka (JP); Takaaki Abe, Yokohama (JP)

(73) Assignee: NISSAN MOTOR CO., LTD., Yokohama-shi (JP)

( * ) Notice: Subject to any disclaimer, the term of this patent is extended or adjusted under 35 U.S.C. 154(b) by 1554 days.

(21) Appl. No.: 12/278,745

(22) PCT Filed: Feb. 9, 2007

(86) PCT No.: PCT/JP2007/052394
§ 371 (c)(1),
(2), (4) Date: Aug. 7, 2008

(87) PCT Pub. No.: WO2007/094263
PCT Pub. Date: Aug. 23, 2007

(65) Prior Publication Data
US 2009/0023059 A1    Jan. 22, 2009

(30) Foreign Application Priority Data

Feb. 13, 2006 (JP) ................................. 2006-035848
Jan. 15, 2007 (JP) ................................. 2007-005817

(51) Int. Cl.
*H01M 2/00* (2006.01)
*H01M 2/26* (2006.01)
(Continued)

(52) U.S. Cl.
CPC .............. *H01M 2/266* (2013.01); *H01M 2/021* (2013.01); *H01M 2/1072* (2013.01); *H01M 10/044* (2013.01)

(58) Field of Classification Search
CPC ... H01M 2/266; H01M 2/20; H01M 10/0468; H01M 10/0481
USPC ........... 429/99–100, 152, 153, 158, 161, 162, 429/157
See application file for complete search history.

(56) References Cited

U.S. PATENT DOCUMENTS 4,060,670 A * 11/1977 Tamminen .................... 429/154
4,091,186 A *  5/1978 Ott et al. ....................... 429/157
(Continued)

FOREIGN PATENT DOCUMENTS

CN        1076887         12/2001
DE    100 20 413 A1       12/2000
(Continued)

OTHER PUBLICATIONS

Japanese Office Action and English Language Translation dated Jul. 3, 2012 (4 pages).
(Continued)

*Primary Examiner* — Maria J Laios
(74) *Attorney, Agent, or Firm* — Foley & Lardner LLP

(57) ABSTRACT

A battery module 11 is structured to include a flat-type battery 40 in which current can be taken out from both faces of an electric generation element 20 in a layered direction, flat-plate-type electrode tabs 50 and 60 having a face contact with a current-taking-out plane of the flat-type battery to take out current, and a packaging case 100 covering the flat-type battery and the electrode tab. The inner face of the packaging case and the electrode tab have therebetween an elastic member 120.

18 Claims, 21 Drawing Sheets

(51) Int. Cl.
*H01M 2/02* (2006.01)
*H01M 2/10* (2006.01)
*H01M 10/04* (2006.01)

(56) References Cited

U.S. PATENT DOCUMENTS

| | | | |
|---|---|---|---|
| 4,181,778 A * | 1/1980 | Land | 429/53 |
| 5,098,801 A * | 3/1992 | Boram et al. | 429/160 |
| 5,264,305 A * | 11/1993 | Charkey | 429/152 |
| 5,482,792 A | 1/1996 | Faita et al. | |
| 5,916,709 A * | 6/1999 | Arias et al. | 429/210 |
| 6,372,380 B1 | 4/2002 | Kitami et al. | |
| 6,777,134 B2 * | 8/2004 | Mori et al. | 429/231.95 |
| 2005/0031953 A1 * | 2/2005 | Watanabe et al. | 429/210 |
| 2009/0081541 A1 * | 3/2009 | Kelley | 429/185 |

FOREIGN PATENT DOCUMENTS

| | | | |
|---|---|---|---|
| JP | 50-088821 U | 7/1975 | |
| JP | 7-142039 A | 6/1995 | |
| JP | 2001-236946 A | 8/2001 | |
| JP | 2002-110239 A | 4/2002 | |
| JP | 2003-229107 A | 8/2003 | |
| JP | 2005-276486 A | 10/2005 | |
| WO | WO 2006/105187 A1 * | 10/2006 | H01M 4/66 |

OTHER PUBLICATIONS

Supplementary European Search Report dated Mar. 10, 2015, 5 pgs.

* cited by examiner

FIG. 1
(A)
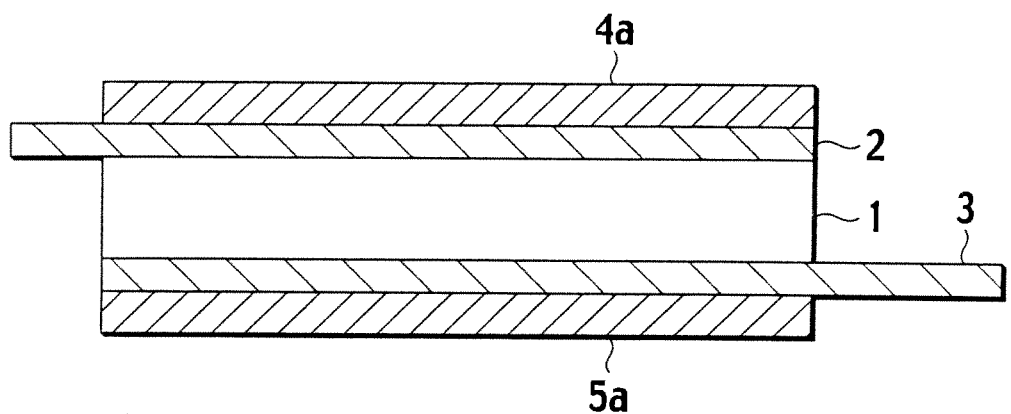
PRIOR ART
(B)
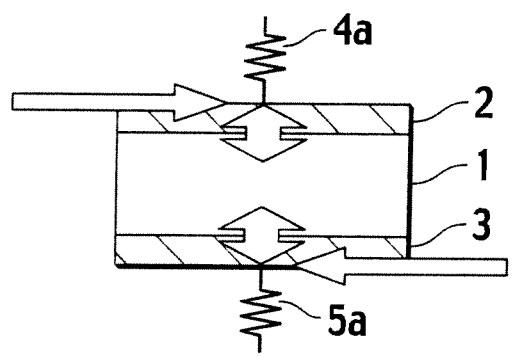
PRIOR ART

FIG. 2
(A)
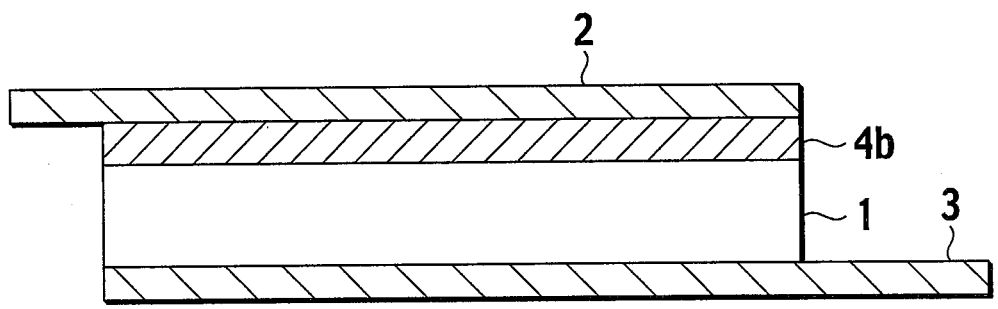
(B)
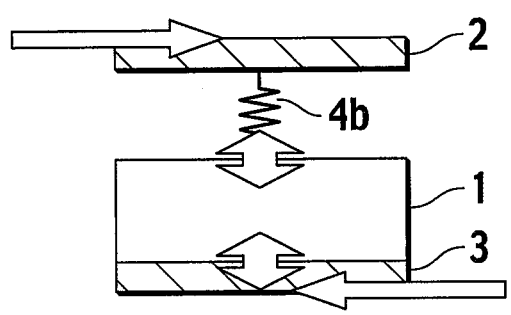

FIG. 3
(A)
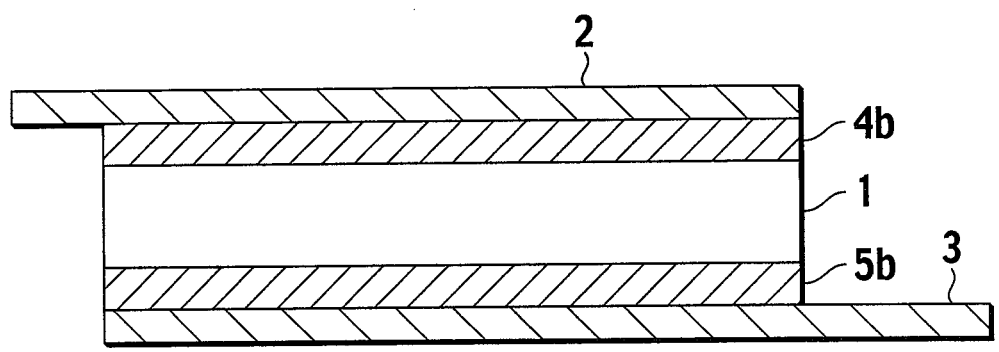
(B)
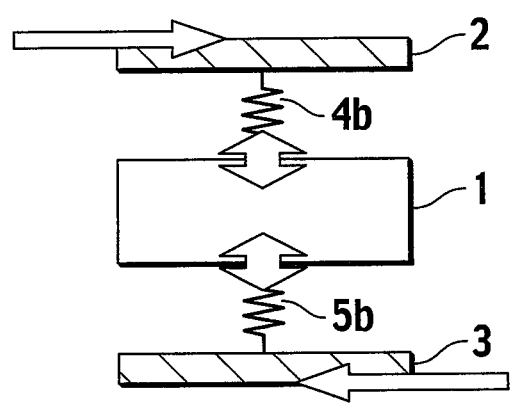

FIG. 4
(A)
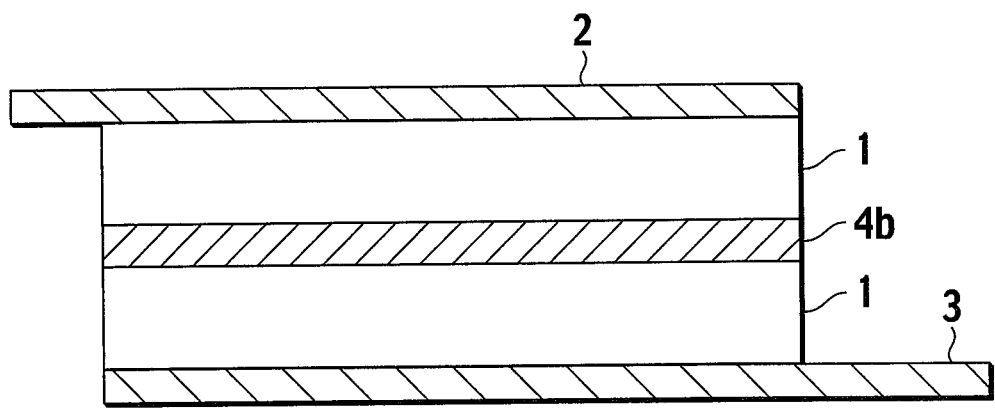
(B)
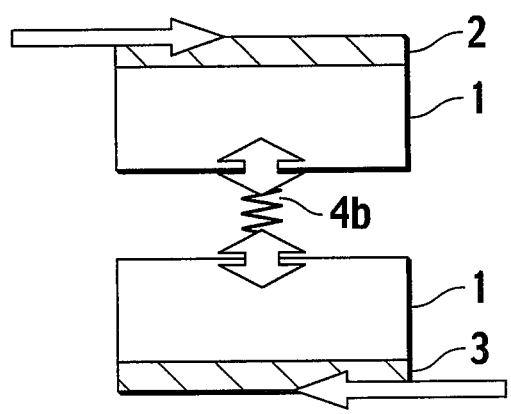

FIG. 5
(A)
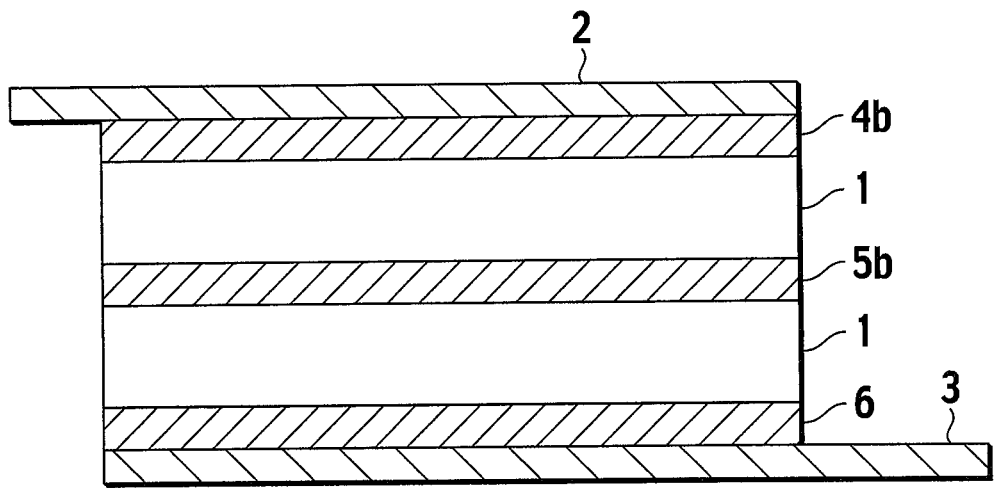
(B)
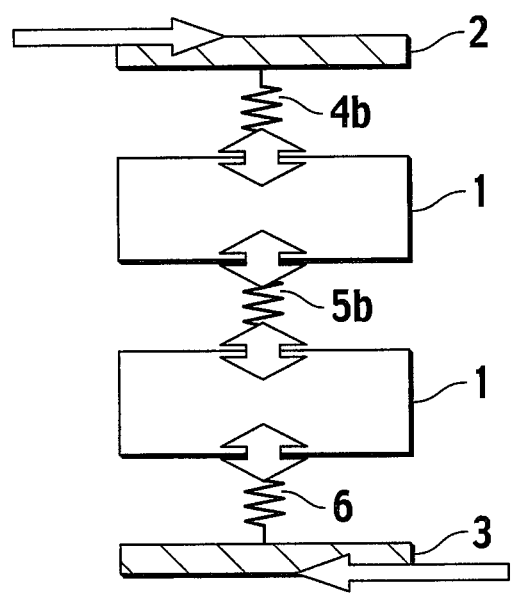

FIG. 11
(A)
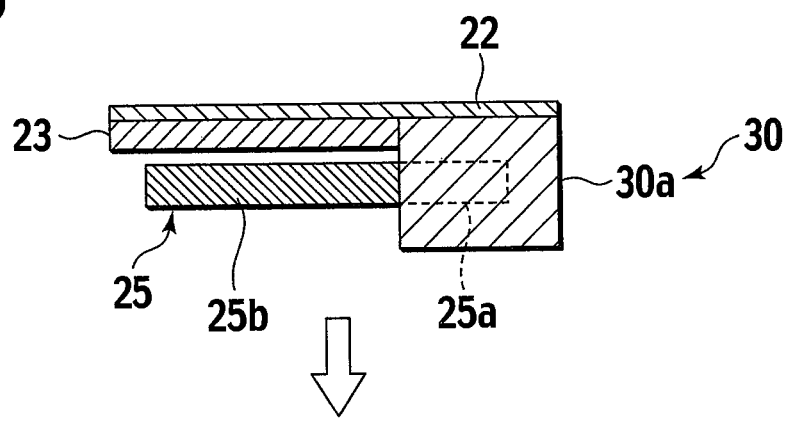
(B)
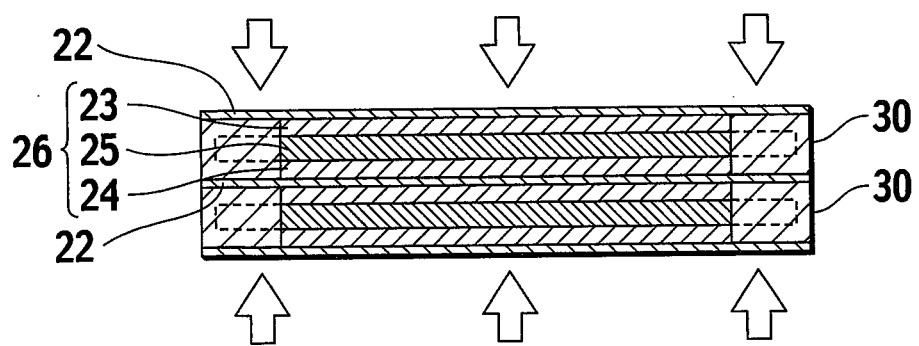

FIG. 28
(A)
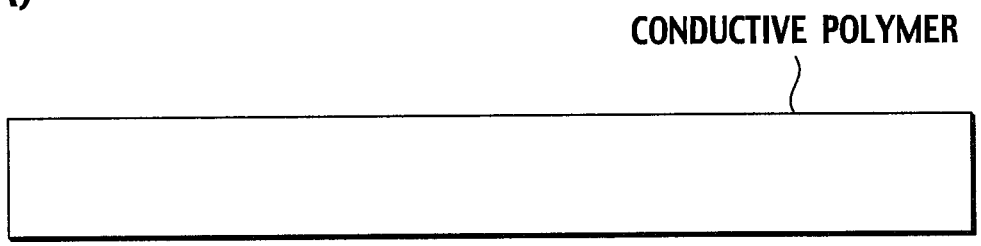
(B)
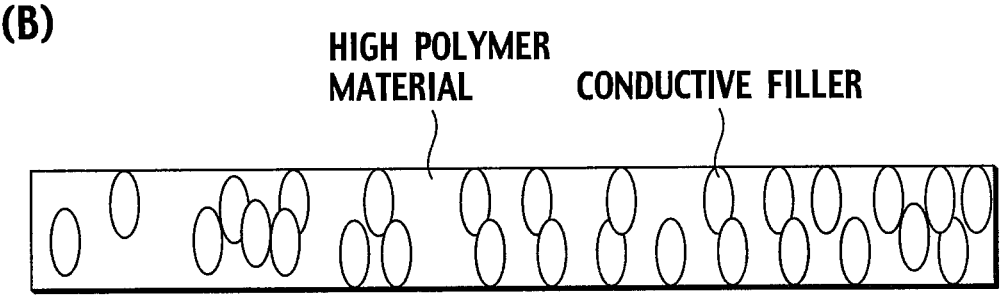

BATTERY MODULE, ASSEMBLED BATTERY, AND VEHICLE INCLUDING THESE BATTERIES

TECHNICAL FIELD

The present invention relates to a battery module structured by layering bipolar batteries, an assembled battery structured by electrically connecting a plurality of battery modules, and a vehicle including these batteries.

BACKGROUND ART

In recent years, reduction of carbon dioxide emission has been urgently required for the purpose of environment protection. The automobile industry is placing its hopes on the reduction of carbon dioxide emission by the introduction of electric vehicles (EV) and hybrid electric vehicles (HEV) and is working on a motor-driven secondary battery that holds the key to the practical application of these vehicles. As shown in Patent Publication 1 below, attention has been paid on a layered bipolar battery as a secondary battery that can achieve a high energy density and a high output density.

A general bipolar battery includes a battery element in which a plurality of bipolar electrodes are serially connected or layered so as to sandwich an electrolyte layer, a packaging member that covers the entirety of the battery element to seal the battery element, and a terminal introduced from the packaging member to the outside in order to take out current. The bipolar electrode is structured so that one face of a collector includes a positive electrode active material layer to form a positive electrode and the other face includes a negative electrode active material layer to form a negative electrode. An electric cell layer is composed of a layered structure obtained by sequentially layering the positive electrode active material layer, the electrolyte layer, and the negative electrode active material layer. This electric cell layer is sandwiched between a pair of collectors. The bipolar battery is advantageous in that current flows in the battery element in a direction along which the bipolar electrode is layered (i.e., in the thickness direction of the battery) to provide a short current path to reduce current loss.

In order to obtain required capacity and voltage, a plurality of bipolar batteries are electrically connected to form a battery module or a plurality of battery modules are electrically connected to form an assembled battery. A battery module is one type of assembled battery including a plurality of electrically-connected bipolar batteries. In this specification, the term "battery module" is used to mean a unit to assemble an "assembled battery".

Prior to the formation of a battery module, an operation is required in advance to use a packaging member to seal battery elements, thus preventing a series of operations for forming the battery module from being reduced. The series of operations for forming a battery module is also prevented from being reduced by another point that a plurality of bipolar batteries must be electrically connected to one another by mutually welding terminals introduced from a packaging member to the outside or must be connected via a connection member such as a bus bar. Another disadvantage of a deteriorated long-term reliability of a battery module is also caused when a battery module is installed in a vehicle such as an automobile or an electric train when compared with a case where the battery module is used in a stationary manner.

In view of the above, the present inventors have investigated the above disadvantages to find that the deteriorated long-term reliability of a battery module is caused by the following causing factors. Specifically, when the vibration from a road surface or a power source is applied to a battery module and is transmitted to the interior of the battery, an electron conduction path in the bipolar battery is deviated to cause the deteriorated long-term reliability of the battery module.

In order to solve this disadvantage, as described in Patent Publication 2 below, a battery module has been suggested that includes a flat-type battery in which current can be extracted from both surfaces in a direction along which an electric generation element is layered, a flat-plate-type electrode tab having a face contact with a current extracting face of the flat-type battery to extract current, and a packaging case covering the flat-type battery and the electrode tab. The inner face of the packaging case and the electrode tab sandwich an elastic member.

However, when the elastic member is provided between the inner face of the packaging case and the electrode tab with the use of a thick and rigid electrode tab for the bipolar battery, a significant influence is caused not only by the vibration entered through the battery packaging but also by the vibration entered through the electrode tab. Thus, there has been a requirement to further improve the resistance to the vibration entered through the electrode tab while reducing the series of operations for forming the battery module. Thus, the present inventors have further worked on this issue to suggest the invention of this application.

It is an objective of the present invention to provide a battery module that can be easily fabricated by reducing a series of manufacture operation, a low-cost assembled battery obtained by electrically connecting the battery modules, and a vehicle including these batteries.

It is another objective of the present invention to provide a battery module having a further-improved vibration resistance, a low-cost assembled battery obtained by electrically connecting the battery modules, and a vehicle including these batteries.

Patent Publication 1: Japanese Laid-Open Patent Publication No. 2001-236946
Patent Publication 2: Japanese Laid-Open Patent Publication No. 2002-110239

DISCLOSURE OF THE INVENTION

The battery module of the present invention for achieving the above objective includes a flat-type battery in which current can be taken out from both sides of an electric generation element in a layered direction, a flat-plate-type electrode tab having a face contact with a current-taking-out plane of the flat-type battery to take out current, and a packaging case covering the flat-type battery and the electrode tab. The battery module of the present invention is characterized in that at least one electron-conductive elastic members are provided between the flat-type battery and the electrode tab or between the flat-type batteries.

According to the battery module of the present invention, the existence of at least one elastic members between the flat-type battery and the electrode tab or between the flat-type batteries can allow, by merely storing the flat-type batteries and the electrode tab in the packaging case to provide the electron-conductive elastic member between the flat-type batteries, the elastic force of the elastic member to push the electrode tab to the current-taking-out plane of the flat-type battery to depress the electric generation element of the flat-type battery. Thus, batteries composing the electric generation element can have a face contact to electrically connect the batteries. This eliminates a need to introduce a terminal from the packaging member to the outer side and also eliminates a need for an operation for welding terminals for example. Thus, a series of manufacture operation can be reduced to easily fabricate the battery module.

The existence of at least one electron-conductive elastic members between the flat-type battery and the electrode tab or between the flat-type batteries allows the flat-type battery to be retained by at least one electron-conductive elastic member. Thus, the vibration transmitted to the battery module can be mitigated by the electron-conductive elastic member, thus securing the long-term reliability of the battery module.

BRIEF DESCRIPTION OF THE DRAWINGS

FIGS. 1(A) and 1(B) are a schematic view illustrating the structure of a conventional battery module.

FIGS. 2(A) and 2(B) are a schematic view illustrating the structure of a battery module according to the first embodiment in which a flat-type battery and a positive electrode tab sandwich an elastic member.

FIGS. 3(A) and 3(B) are a schematic view illustrating the structure of the battery module according to the first embodiment in which a flat-type battery and a positive electrode tab sandwich a elastic member and the flat-type battery and a negative electrode tab sandwich a elastic member, respectively.

FIGS. 4(A) and 4(B) are a schematic view illustrating the structure of the battery module according to the first embodiment in which two layered flat-type batteries sandwich an elastic member.

FIGS. 5(A) and 5(B) are a schematic view illustrating the structure of the battery module according to the first embodiment in which a flat-type battery and a positive electrode tab sandwich an elastic member, the flat-type battery and a negative electrode tab sandwich an elastic member, and two layered flat-type batteries sandwich an elastic member, respectively.

FIG. 11(A) is a cross-sectional view illustrating the main part where the electrolyte layer having the separator including the seal section and the bipolar electrode are layered.

FIG. 11(B) is a cross-sectional view illustrating a battery element in which the electrolyte layer and the bipolar electrode are layered is applied with pressure from both sides along the layered direction to closely attach the seal section to a collector.

FIGS. 28(A) and 28(B) are schematic views illustrating the structure of an elastic member.

BEST MODE FOR CARRYING OUT THE INVENTION

Figure 6:
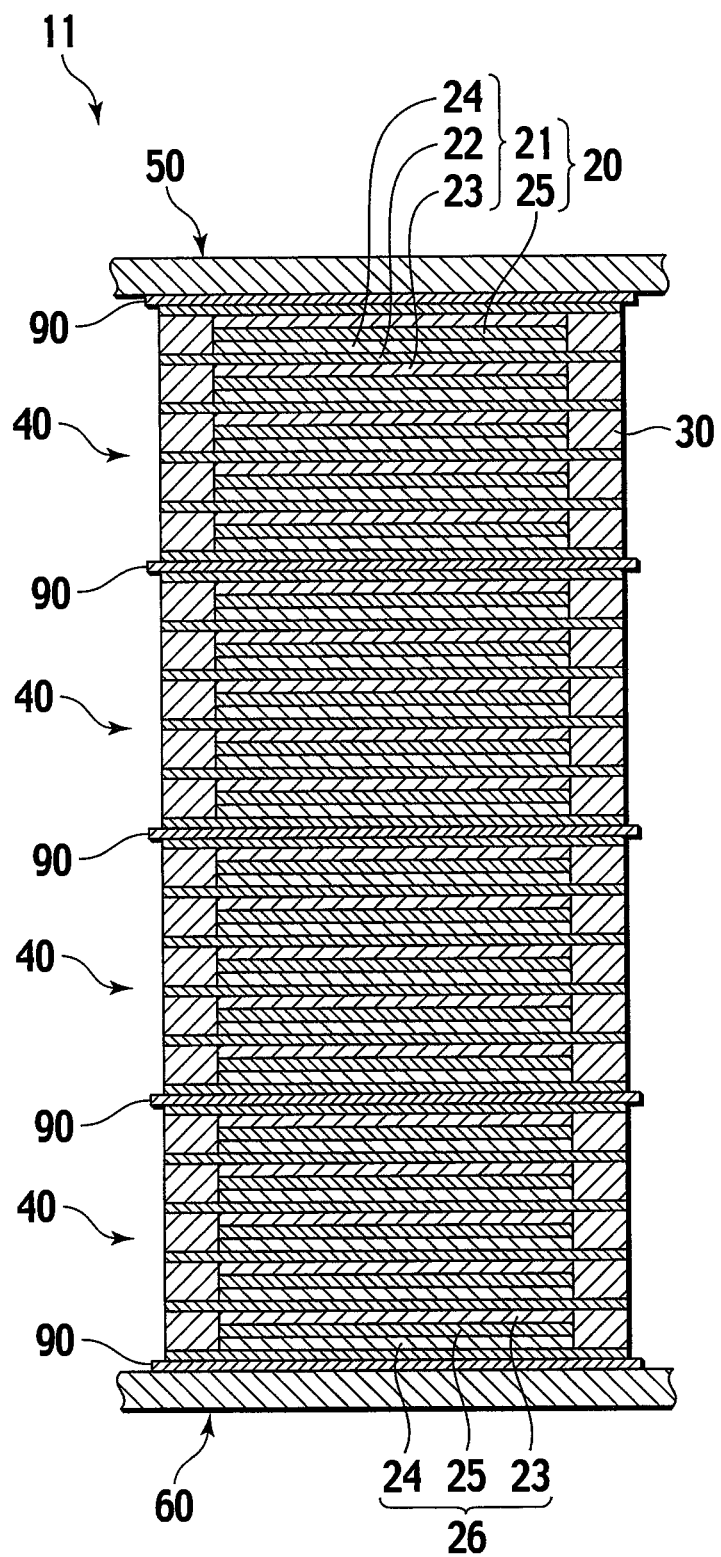
FIG. 6 is a cross-sectional view illustrating a layered structure of a battery module according to the second embodiment.

Hereinafter, embodiments of a battery module, an assembled battery, and a vehicle including these batteries according to the present invention will be described with reference to the drawings. Although the drawings referred to by the following embodiments exaggerate the thicknesses and shapes of the respective layers constituting a battery, this is for an easy understanding of the contents of the invention and the drawings do not illustrate actual thicknesses and shapes of the respective layers of the battery.

(First Embodiment)

FIGS. 1(A) and 1(B) are a schematic view illustrating the structure of a conventional battery module disclosed in Japanese Laid-Open Patent Publication No. 2002-110239. FIGS. 2(A) and 2(B) are a schematic view illustrating the structure of the battery module according to the present invention having a structure in which a flat-type battery and a positive electrode tab sandwich an electron-conductive elastic member. FIGS. 3(A) and 3(B) are a schematic view illustrating the structure of the battery module according to the present invention having a structure in which a flat-type battery and a positive electrode tab sandwich an electron-conductive elastic member and the flat-type battery and a negative electrode tab sandwich an electron-conductive elastic member, respectively. FIGS. 4(A) and 4(B) are a schematic view illustrating the structure of the battery module according to the present invention having a structure in which two layered flat-type batteries sandwich an electron-conductive elastic member. FIGS. 5(A) and 5(B) are a schematic view illustrating the structure of the battery module according to the present invention having a structure in which a flat-type battery and a positive electrode tab sandwich an electron-conductive elastic member, the flat-type battery and a negative electrode tab sandwich an electron-conductive elastic member, and two layered flat-type batteries sandwich an electron-conductive elastic member, respectively.

The battery module according to the present invention includes: a flat-type battery in which current can be taken out from both sides of an electric generation element in the layered direction; flat-plate-type positive and negative electrode tabs having a face contact with the current-taking-out plane of the flat-type battery to take out current; and a packaging case (not shown) covering the flat-type battery and the electrode tabs. As shown in FIG. 2(A) to FIG. 5(B), at least one electron-conductive elastic members are provided between the flat-type battery and the electrode tab or between the flat-type batteries.

Based on the diagrams shown in FIG. 1(A) to FIG. 5(B), a principle according to which the battery module according to the present invention has vibration resistance will be described in the comparison with a conventional battery module.

FIG. 1(A) is a schematic view illustrating a battery module of Patent Publication 2 introduced in the "Background Art" section. Differing from the battery module of the present invention, this battery module has an elastic members between other battery modules. In FIG. 1(A), a flat-type battery 1 is a part generally called as an electric generation element having a structure in which a positive electrode layer, a separator, and a negative electrode layer are sequentially layered multiple times The battery module of Patent Publication 2 has a structure in which upper and lower ends of the flat-type battery 1 in the layered direction are attached with a positive electrode tab 2 and a negative electrode tab 3. Outer sides of the positive electrode tab 2 and the negative electrode tab 3 in the layered direction are closely attached with an elastic member 4a and an elastic member 5a for absorbing vibration.

FIG. 1(B) shows a vibration model of the battery module shown in FIG. 1(A). The flat-type battery 1 has a structure in which the elastic member 4a and the elastic member 5a that function as a spring sandwich the upper and lower ends in the layered direction. Due to this structure, when vibration is applied to the battery module, the magnitude of the vibration may be slightly reduced but the reduced vibration is directly applied to the flat-type battery 1 and thus the vibration-reducing effect is not so significant. When vibration is directly applied from the positive electrode tab 2 and the negative electrode tab 3 in particular, the vibration is directly transmitted to the flat-type battery 1, thus substantially failing to provide a vibration-reducing effect.

FIG. 2(A) shows the battery module according to the present invention. This battery module is structured so that the flat-type battery 1 and the positive electrode tab 2 sandwich an electron-conductive elastic member 4b. The electron-conductive elastic member 4b must have a function to flow current from the flat-type battery 1 to the positive electrode tab 2 and thus must be conductive.

Thus, the electron-conductive elastic member 4b is made of high polymer material with conductivity, and desirably the high polymer material itself is a conductive polymer having conductivity (see FIG. 28(A)). Electrically-conductive polymer may be polyaniline, polypyrrole, polythiophene, polyacetylene, poly-para-phenylene, poly phenylene vinylene, polyacrylonitrile, or polyoxadiazole for example. The electron-conductive elastic member 4b is made of conductive high polymer material that is composed of high polymer material and conductive filler for providing an electrical conductivity (see FIG. 28(B)). High polymer material may be polyolefin (polypropylene, polyethylene), polyester (PET, PEN), polyimide, polyamide, PolyVinylidine DiFluoride (PvdF), epoxy resin, or synthetic rubber material. Electrically-conductive filler is preferably Ag fine particles, Au fine particles, Cu fine particles, Al metal fine particles, SUS fine particles, or Ti fine particles and is more preferably carbon fine particles. These conductive fillers may be the ones obtained by coating particle system ceramic material or resin material with conductive material by plating for example. The electron-conductive elastic member 4b also may be made of conductive nonwoven fabric or woven fabric.

Since the electron-conductive elastic member 4b must have a cushion function to absorb the vibration applied to the battery module, the electron-conductive elastic member 4b has an elastic force that may apply, when the flat-type battery 1 minimally contracts, a pressure to a part at which the positive electrode tab 2 has a contact with the flat-type battery 1. The electron-conductive elastic member 4b has a thickness that may accommodate the thermal expansion of the flat-type battery 1 and can accommodate the contraction of the flat-type battery 1 during charge and discharge. The electron-conductive elastic member 4b also has a friction coefficient by which the flat-type battery 1 receiving repeated stress is prevented from being moved. The electron-conductive elastic member 4b also has a Young's modulus in a range from 0.01 to $0.30 \times 10^{10} N/m^2$. The electron-conductive elastic member 4b having a Young's modulus within this range allows, when the battery module is provided in a vehicle, the resonance frequency of the battery module to be shifted from the resonance frequency of the vehicle (100 Hz or lower) to the high frequency side. This effect allows, so long as the battery module is used in the vehicle, the battery module to be used in a vibration frequency region deviated from the resonance frequency, thus providing a high vibration isolation effect.

FIG. 2(B) shows a vibration model of the battery module shown in FIG. 2(A). The flat-type battery 1 has a structure in which the electron-conductive elastic member 4b functioning as a spring is sandwiched between the flat plate battery 1 and the positive electrode tab 2. This structure allows, when vibration is applied to the battery module 1, the magnitude of the vibration transmitted from the positive electrode tab 2 to the flat plate battery 1 is significantly mitigated. Thus, the effect of mitigating the vibration transmitted from the positive electrode tab 2 to the flat plate battery 1 is higher than that of the conventional battery module shown in FIG. 1(A).

FIG. 3(A) shows the battery module according to the present invention. This battery module is structured so that the flat-type battery 1 and the positive electrode tab 2 sandwich the electron-conductive elastic member 4b and the flat-type battery 1 and the negative electrode tab 3 sandwich the electron-conductive elastic member 5b, respectively. The electron-conductive elastic member 4b must have a function to flow current from the flat-type battery 1 to the positive electrode tab 2. The electron-conductive elastic member 5b also must have a function to flow current from the flat-type battery 1 to the negative electrode tab 3. Thus, the electron-conductive elastic member 4b and the electron-conductive elastic member 5b must be conductive. The electron-conductive elastic member 4b and the electron-conductive elastic member 5b have the same constituting material, elastic force, and Young's modulus as the above-described ones.

FIG. 3(B) shows the vibration model of the battery module shown in FIG. 3(A). The flat-type battery 1 has a structure in which the electron-conductive elastic member 4b functioning as a spring is sandwiched between the flat plate battery 1 and the positive electrode tab 2 and the electron-conductive elastic member 5b is sandwiched between the flat plate battery 1 and the negative electrode tab 3, respectively. Thus, when vibration is applied to the battery module 1, the magnitude of the vibration transmitted from the positive electrode tab 2 and the negative electrode tab 3 to the flat plate battery 1 is further mitigated than in the case of the battery module having the structure shown in FIG. 2(A). Therefore, the effect of mitigating the vibration transmitted from the positive electrode tab 2 to the flat plate battery 1 is far higher than that of the conventional battery module shown in FIG. 1(A).

FIG. 4(A) shows the battery module according to the present invention. This battery module has a structure in which the two layered flat-type batteries 1 sandwich the electron-conductive elastic member 4b. The electron-conductive elastic member 4b must have a function to flow current between the flat-type batteries 1. Thus, the electron-conductive elastic member 4b must be conductive. The electron-conductive elastic member 4b and the electron-conductive elastic member 5b have the same constituting material, elastic force, and Young's modulus as the above-described ones.

FIG. 4(B) shows the vibration model of the battery module shown in FIG. 4(A). The flat-type battery 1 has a structure in which the electron-conductive elastic member 4b functioning as a spring is sandwiched between one flat plate battery 1 and the other flat plate battery 1, respectively. Thus, when vibration is applied to one of the battery modules 1, the vibration transmitted to the other flat plate battery 1 has a magnitude that is mitigated when compared with the case of the battery module having the structure shown in FIG. 2(A).

FIG. 5(A) shows the battery module according to the present invention. This battery module has a structure in which the flat-type battery 1 and the positive electrode tab 2 sandwich the electron-conductive elastic member 4b, one flat-type battery 1 and the other flat-type battery 1 sandwich the electron-conductive elastic member 5b, and the flat-type battery 1 and the negative electrode tab 3 sandwich the electron-conductive elastic member 6, respectively. The electron-conductive elastic member 4b must have a function to flow current from the flat-type battery 1 to the positive electrode tab 2. The electron-conductive elastic member 5b also must have a function to flow current between the flat-type batteries 1. The electron-conductive elastic member 6 also must have a function to flow current from the flat-type battery 1 to the negative electrode tab 3. Thus, the electron-conductive elastic member 4b, the electron-conductive elastic member 5b, and the electron-conductive elastic member 6 must be conductive. The electron-conductive elastic member 4b, the electron-conductive elastic member 5b, and the electron-conductive elastic member 6 have the same constituting material, elastic force, and Young's modulus as the above-described ones.

FIG. 5(B) shows the vibration model of the battery module shown in FIG. 5(A). The flat-type battery 1 has a structure in which the electron-conductive elastic member 4b functioning as a spring is sandwiched between the flat plate battery 1 and the positive electrode tab 2, the electron-conductive elastic member 5b is sandwiched between one flat plate battery 1 and the other flat plate battery 1, and the electron-conductive elastic member 6 is sandwiched between the flat plate battery 1 and the negative electrode tab 3, respectively. Thus, when vibration is applied to the battery module 1, the magnitude of the vibration transmitted from the positive electrode tab 2 and the negative electrode tab 3 to the flat plate battery 1 is further mitigated than in the case of the battery module having the structure shown in FIG. 2(A) introduced in the above embodiment. Thus, the effect of mitigating the vibration transmitted from the positive electrode tab 2 to the flat plate battery 1 is far higher than that of the conventional battery module shown in FIG. 1(A).

(Second Embodiment)

Figure 7:
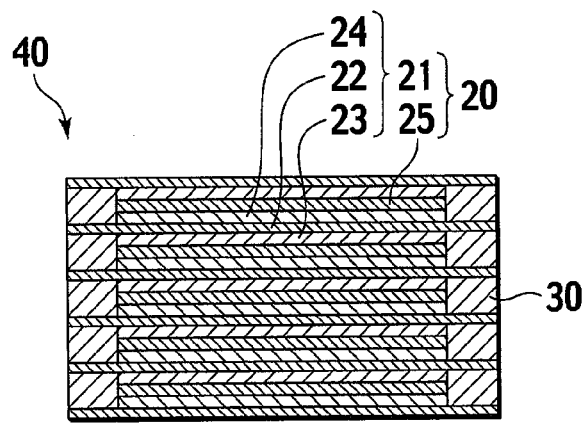
FIG. 7 is a cross-sectional view illustrating a bipolar battery.
Figure 8:
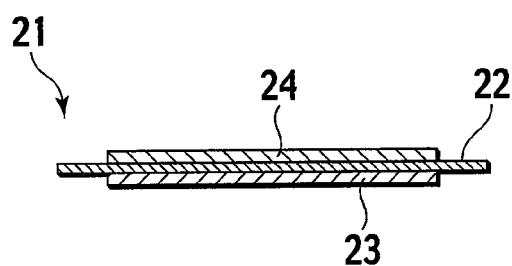
FIG. 8 is a cross-sectional view illustrating a bipolar electrode.
Figure 9:
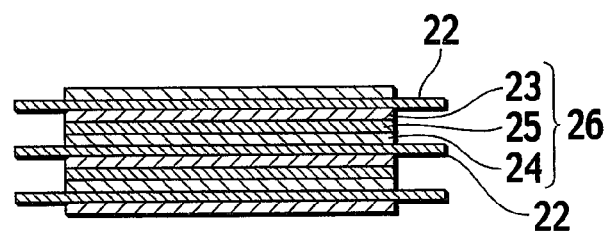
FIG. 9 is a cross-sectional view for the description of an electric cell layer.
Figure 10:
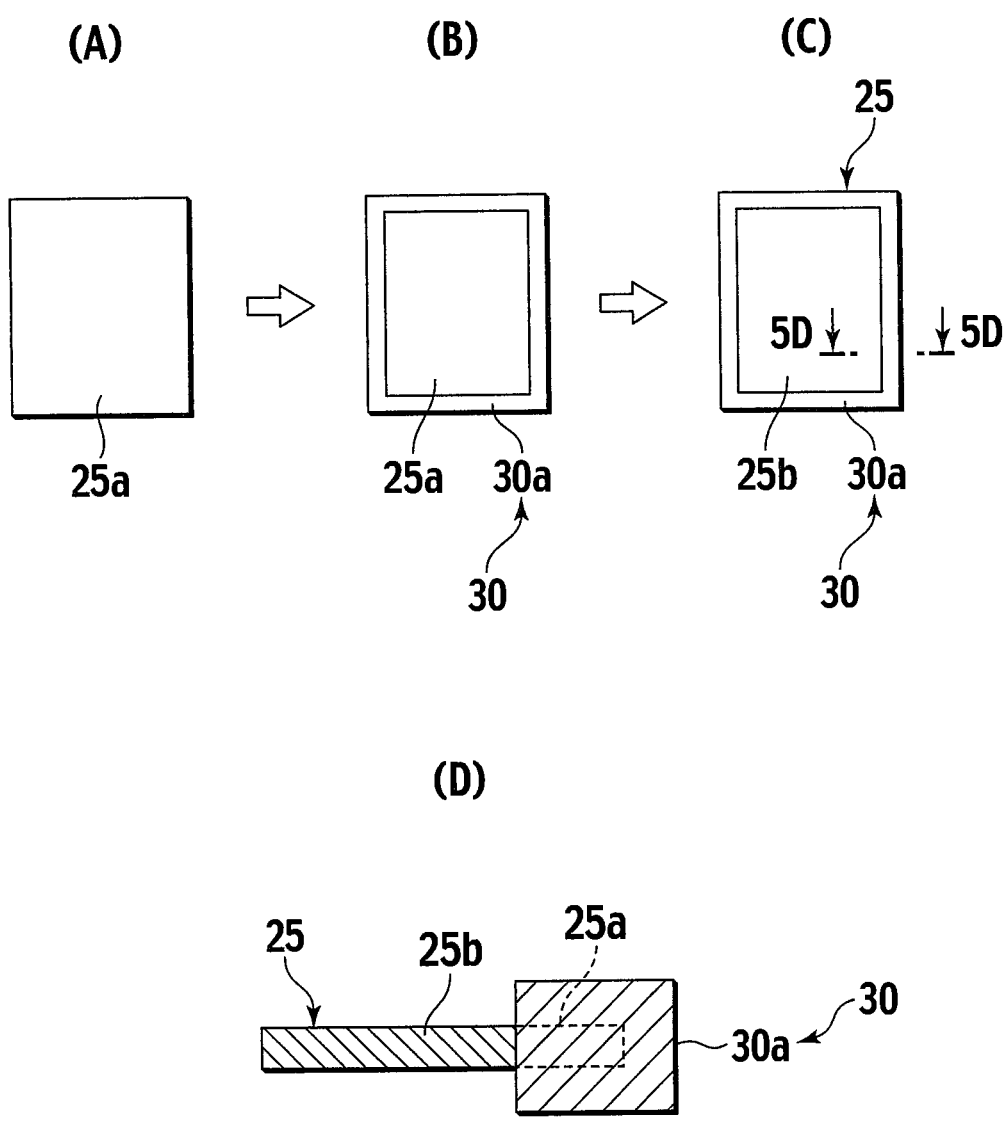
FIGS. 10(A) to 10(D) illustrate, in a stepwise manner, the manufacture process of an electrolyte layer in which separator includes a seal section.

FIG. 6 is a cross-sectional view illustrating the layered structure of a battery module 11 according to the second embodiment of the present invention. FIG. 7 is a cross-sectional view illustrating a bipolar battery 40 shown in FIG. 6. FIG. 8 is a cross-sectional view illustrating a bipolar electrode 21. FIG. 9 is a cross-sectional view for the description of an electric cell layer 26. FIG. 10 illustrates, in a stepwise manner, the manufacture process of an electrolyte layer 25 in which a separator 25a includes a seal section 30. FIG. 10(A) is a schematic top view illustrating the separator 25a forming a base of the electrolyte layer 25. FIG. 10(B) is a schematic top view illustrating the seal section 30 formed at the outer periphery of the separator 25a. FIG. 10(C) is a schematic top view illustrating an electrolyte section 25b formed at the inner side of the seal section 30 of the separator 25a to complete the electrolyte layer 25. FIG. 10(D) is a cross-sectional view taken along the line 5D-5D in FIG. 10(C). FIG. 11(A) is a cross-sectional view of the main part illustrating a layered structure of the electrolyte layer 25 having the separator 25a including the seal section 30 and the bipolar electrode 21. FIG. 11(B) is a cross-sectional view illustrating the battery element 20 in which the electrolyte layer 25 and the bipolar electrode 21 are layered is applied with a pressure from both sides along the layered direction to closely attach the seal section 30 to the collector 22.

In the second embodiment, the battery module 11 has a structure in which a plurality of the bipolar batteries 40 are layered in a direction along which the bipolar electrode 21 is layered (an up-and-down direction in FIG. 1). In the shown example, four bipolar batteries 40 for example are electrically serially connected to one another. This electrical connecting formation is called as "four serial". The bipolar battery 40 has a flat rectangular shape (flat shape) (see FIG. 12). Both surfaces of the four serial flat-type battery have flat-plate-type positive electrode tab 50 and negative electrode tab 60 for taking out current that are provided to have a face contact with the current-taking-out plane. The positive electrode tab 50 and the negative electrode tab 60 are composed of a conductive metal plate made of copper, aluminum, and stainless steel for example. In FIG. 6, the positive electrode tab 50 shown at the upper side is electrically connected to the positive electrode of the highest bipolar battery 40 and the negative electrode tab 60 shown at the lower side is electrically connected to the negative electrode of the lowest bipolar battery 40. Although the battery module 11 in the shown example has the four serial bipolar batteries 40, the number of layers may be arbitrarily selected.

In the following description, a direction along which the bipolar electrode 21 is layered (i.e., the thickness direction of the battery) will be called a "layered direction" and a direction orthogonal to the layered direction (i.e., a direction along which the collector 22 for example extends) will be called a "face direction". The positive electrode tab 50 and the negative electrode tab 60 also may be collectively called an electrode tab if required.

As shown in FIG. 8, the bipolar electrode 21 has a structure in which one surface of the collector 22 has a positive electrode active material layer 23 to form a positive electrode and the other surface has a negative electrode active material layer 24 to form a negative electrode. At the end positive electrode of the battery element 20, one surface of the collector 22 has only a positive electrode active material layer 23 that is layered on the highest bipolar electrode 21 via the electrolyte layer 25 in FIG. 7. At the end negative electrode of the battery element 20, one surface of the collector 22 has only a negative electrode active material layer 24 that is layered under the lowest bipolar electrode 21 via the electrolyte layer 25 in FIG. 7. The end positive electrode and the end negative electrode are both one type of the bipolar electrode 21. The electrolyte layer 25 has a structure in which electrolyte is retained by the separator 25a constituting a base (see FIG. 10(A)).

As shown in FIG. 9, the electric cell layer 26 is structured by layering the positive electrode active material layer 23, the electrolyte layer 25, and the negative electrode active material layer 24. The electric cell layer 26 is sandwiched between neighboring collectors 22 in the battery element 20 in which the bipolar electrodes 21 are layered. Although the bipolar battery 40 in the shown example includes the electric cell layer 26 of five layers, the number of layers can be arbitrarily selected. The bipolar battery 40 including the electric cell layer 26 of five layers has a thickness of 500 μm to 600 μm for example.

The seal section 30 blocks the electric cell layer 26 from outside air. This prevents the short-circuiting (liquid junction) due to the leakage of liquid or semisolid gel-like electrolyte. This also prevents air or moisture included in air from reacting with active material. The seal section 30 of this embodiment is formed at the outer periphery of the separator 25a of the electrolyte layer 25 (see FIG. 10(D)). The electrolyte layer 25 including the seal section 30 is generally manufactured in the following manner.

First, the separator 25a having a size corresponding to the electrolyte layer 25 is prepared as a base of the electrolyte layer 25 (see FIG. 10(A)). Next, resin 30a (solution) for a sealing purpose is placed at the outer periphery of the separator 25a to form the seal section 30 (see FIG. 10(B)). The outer periphery of the separator 25a means the outer side of a part at which the electrolyte is retained by the separator 25a. The resin 30a for a sealing purpose is placed at the outer periphery of the separator 25a by using a formwork having an appropriate shape to fill or inject the resin 30a or to coat or impregnate the resin 30a for example. The seal section 30 is formed at both of the top face and the back face of the separator 25a. The seal section 30 protruding from both of the top face and the back face of the separator 25a respectively has a thickness (height) that is larger than the thickness of the positive electrode and the thickness of the negative electrode. Next, the electrolyte is retained by the separator 25a at the inner side of the seal section 30 to form the electrolyte section 25b (see FIGS. 10(C) and 10(D)). The electrolyte section 25b is formed by an appropriate method such as the one to coat raw material slurry for the electrolyte to impregnate the slurry to physically cross-link the slurry or the one to further polymerize the slurry to chemically cross-link the slurry. Through the above process, the electrolyte layer 25 can be manufactured in which the electrolyte is retained by the separator 25a and the resin 30a for a sealing purpose that forms the seal section 30 is placed at a part of the separator 25a at which the electrolyte is retained (i.e., the outer periphery of the electrolyte section 25b).

The separator 25a may be any of a microporous membrane separator and a nonwoven fabric separator.

A microporous membrane separator may be a porous sheet consisting of polymer for absorbing and retaining electrolyte for example. Polymer may be composed of, for example, polyethylene (PE), polypropylene (PP), a laminated body having a three-layer structure (PP/PE/PP), or polyimide.

A nonwoven fabric separator may be a sheet obtained by entangling fibers for example or also may be spunbond obtained by fusing heated fibers. Specifically, any nonwoven fabric separator may be used so long as the nonwoven fabric separator has a sheet-like shape obtained by using an appropriate method to arrange fibers to form a web (thin cotton) or a mat to join fibers by an appropriate adhesive agent or the fusion force of the fibers themselves. Fibers used in the invention are not limited to particular ones and may be, for example, the conventionally-known ones such as cotton, rayon, acetate, nylon, polyester, polyolefin (e.g., polypropylene, polyethylene), polyimide, or aramid. These fibers are used separately or in combination depending on an intended purpose (e.g., mechanical strength required for the electrolyte layer 25).

The resin 30a for a sealing purpose provided at the outer periphery of the separator 25a may have any shape so long as the shape can effectively achieve the effect of sealing the electric cell layer 26 and the shape is not limited to a particular one. For example, the resin 30a for a sealing purpose can be provided to have the rectangular cross-sectional shape shown in FIG. 10(D), a semicircular cross-sectional shape, or an elliptic cross-sectional shape.

The seal section 30 obtained by placing the resin 30a for a sealing purpose desirably penetrates the separator 25a or covers the entire periphery of the side face of the separator 25a. The reason is that the electric cell layer 26 can be blocked from outside air via the interior of the separator 25a.

The resin 30a for a sealing purpose is preferably rubber-base resin that has a close contact to the collector 22 when being pressurized and deformed or heat-sealable resin that has a close contact with the collector 22 when being heated and pressurized and heat-sealed (e.g., olefin-base resin).

In the shown example, the resin 30a for a sealing purpose is rubber-base resin. The rubber-base seal section 30 formed with rubber-base resin can use the elasticity of the rubber-base resin to block the electric cell layer 26 from outside air. Even under an environment in which the stress due to vibration or impact is iteratively applied to the bipolar battery 40, the rubber-base seal section 30 can easily twist or deform to follow the twist or deformation of the bipolar battery 40, thus continuously providing the sealing effect. The rubber-base seal section 30 also does not require a heat-sealing processing and thus is advantageous in providing reduced battery manufacture steps. Rubber-base resin is not limited to a particular one and is preferably selected from the group consisting of silicon-base rubber, fluorine-base rubber, olefin-base rubber, and nitrile-base rubber. These rubber-base resins have superior sealing characteristic, alkaline resistance, chemical resistance, durability, weather resistance, and heat resistance for example and can maintain, even under a usage environment, these superior performances and qualities without deterioration for a long period of time. Thus, the electric cell layer 26 can be blocked from outside air (i.e., the electric cell layer 26 can be sealed) effectively for a long period of time. However, the resin 30a is not limited to the illustrated rubber-base resins.

FIGS. 11(A) and 11(B) illustrate the rubber-base seal section 30 closely attached to the collector 22. As shown in FIG. 11(A), the separator 25a is layered with the electrolyte layer 25 having the rubber-base seal section 30 and the bipolar electrode 21. The rubber-base seal section 30 is molded to have a thickness larger than the thickness of the positive electrode or the negative electrode. Thus, as shown in FIG. 11(B), the battery element 20 in which the electrolyte layer 25 and the bipolar electrode 21 are layered is applied with pressures from both sides in the layered direction to pressurize and deform the rubber-base seal section 30 to closely attach the rubber-base seal section 30 to the collector 22. In this embodiment, the rubber-base seal section 30 is further heated when being pressurized. By heat-sealing the rubber-base seal section 30 while being pressurized and deformed, the rubber-base seal section 30 is strongly joined (or adhered or fused) to the collector 22. This eliminates a need to always pressurize the bipolar battery 40 from the outside, thus eliminating a need for a member for always pressurizing the rubber-base seal section 30 for example. Only a part at which the rubber-base seal section 30 is placed may be pressurized or the entire battery element 20 including the part at which the rubber-base seal section 30 is placed also may be pressurized. Considering an influence by the heating process on battery components other than the rubber-base seal section 30, the part at which the rubber-base seal section 30 is placed is desirably heated and parts other than the part at which the rubber-base seal section 30 is placed is desirably subjected to a pressurizing process only.

Although not shown, when heat-sealing resin-base seal section made of heat-sealable resin is used in pressurizing and heating the battery element 20 in which the electrolyte layer 25 and the bipolar electrode 21 are layered from both sides along the layered direction, the heat-sealing can block the electric cell layer 26 from outside air. Any heat-sealable resin may be used so long as the heat-sealable resin constituting the seal section can realize a superior sealing effect under any usage environment under which the bipolar battery 40 is used. Preferred heat-sealable resin is selected from the group consisting of silicon, epoxy, urethane, polybutadiene, olefin-base resin (e.g., polypropylene, polyethylene), and paraffin wax. These heat-sealable resins have superior sealing characteristic, alkaline resistance, chemical resistance, durability, weather resistance, and heat resistance for example and can maintain, even under a usage environment, these superior performances and qualities without deterioration for a long period of time. Thus, the electric cell layer 26 can be blocked from outside air (i.e., the electric cell layer 26 can be sealed) effectively for a long period of time. However, the invention is not limited to the illustrated heat-sealable resin. More preferred heat-sealable resin is resin such as modified polypropylene having an improved adhesiveness to the collector 22. Heat-sealable resin may be heated at a temperature that is higher than the heat-sealing temperature of the heat-sealable resin and that does not cause an influence on other battery components. Thus, the temperature for heating heat-sealable resin may be appropriately determined depending on the type of the heat-sealable resin. For example, modified polypropylene is preferably heated at 200 degrees C. However, the invention is not limited to this. With regards to a part to be pressurized and a part to be heated, the same description for the rubber-base seal section 30 applies.

The seal section 30 also may be a three-layer film in which a non-fusing layer is sandwiched between fusing layers.

The size of the seal section 30 is not limited to the size as shown in FIG. 11 in which the seal section 30 does not protrude from an end of the collector 22 in the face direction. The seal section 30 also may be sized so as to protrude from the end of the collector 22 in the face direction. The reason is that the internal short circuit due to the contact of outer edges of the collector 22 can be securely avoided.

The seal section can be arranged to surround the electric cell layer independent of the electrolyte layer. However, this arrangement requires a battery manufacture to be carried out so that the layering of the electrolyte layer is carried out separately from the layering of the seal section, thus causing a risk of complicated or troublesome manufacture steps. In contrast with this, this embodiment provides the seal section 30 at the electrolyte layer 25. Thus, the battery manufacture can be carried out so that the layering of the electrolyte layer 25 is carried out simultaneously with the layering of the seal section 30. Such a simple battery manufacture step can reduce the cost of the product.

The positive electrode tab 50 and the negative electrode tab 60 are applied with a pressing force as described later to maintain the plurality of bipolar batteries 40 sandwiched therebetween. The upper electrode tab 50 and the lower electrode tab 60 preferably have a contact with the bipolar battery 40 via an electron-conductive elastic member 90 (see FIG. 11 and FIG. 12). The collector 22 is made of a metal foil and thus has an uneven shape when being seen microscopically, thus causing a risk of an increased contact resistance between the electrode tabs 50 and 60. By allowing the upper electrode tab 50 and the lower electrode tab 60 to have a contact with the bipolar battery 40 via the electron-conductive elastic member 90, the contact state between the electrode tabs 50 and 60 can be improved to reduce the contact resistance therebetween.

Due to the same reason, the layered bipolar batteries 40 are preferably have a contact via the electron-conductive elastic member 90. In particular, the existence of the electron-conductive elastic members 90 among the bipolar batteries 40 can alleviate the stress caused due to a difference among the bipolar batteries 40 in the thermal expansion coefficient or the temperature.

The electron-conductive elastic member 90 may be made of any elastic material that can reduce the contact resistance between the electrode tabs 50 and 60 and the bipolar battery 40 and the contact resistance between the bipolar batteries 40 and is not limited to a particular material. For example, the electron-conductive elastic member 90 can be made of conductive resin or conductive rubber for example. By allowing these materials to have a close contact with the collector 22 to bury minute concave sections, a favorable contact state to the collector 22 is obtained. The electron-conductive elastic member also may be composed of a double-faced adhesive tape for example. The existence of the electron-conductive elastic members 90 among the bipolar batteries 40 also can provide a more favorable contact state to the collector 22 when compared with a case where the collectors 22 having a minute uneven shape have a contact to each other. The conductive elastic member also may be provided by an appropriate combination of conductive resin, conductive rubber, and a metal plate.

When the bipolar batteries 40 are retained by the upper electrode tab 50 and the lower electrode tab 60, the electron-conductive elastic member 90 is preferably made of a conductive rubber sheet. The electron-conductive elastic member 90 made of a conductive rubber sheet can provide the density, a protected power collecting foil, the vibration resistance, and the accommodation of a change in the deposition thickness due to a temperature change for example. A conductive rubber sheet is made of conductive resin obtained by dispersing carbon or metal fine particles in resin or conductive plastic.

The favorable contact state of the electron-conductive elastic member 90 and the collector 22 having a minute uneven shape can reduce the contact resistance to allow the battery module 11 to have a higher output. When the electrode tabs 50 and 60 and the bipolar battery 40 have therebetween a small contact resistance and the bipolar batteries 40 have therebetween a small contact resistance (e.g., when the collector 22 has an improved flatness), the electron-conductive elastic member 90 is not always required. Although the drawing shows the electron-conductive elastic member 90 protruded from an end of the bipolar battery 40 in the face direction for an easy understanding, the invention is not limited to this case.

Figure 12:
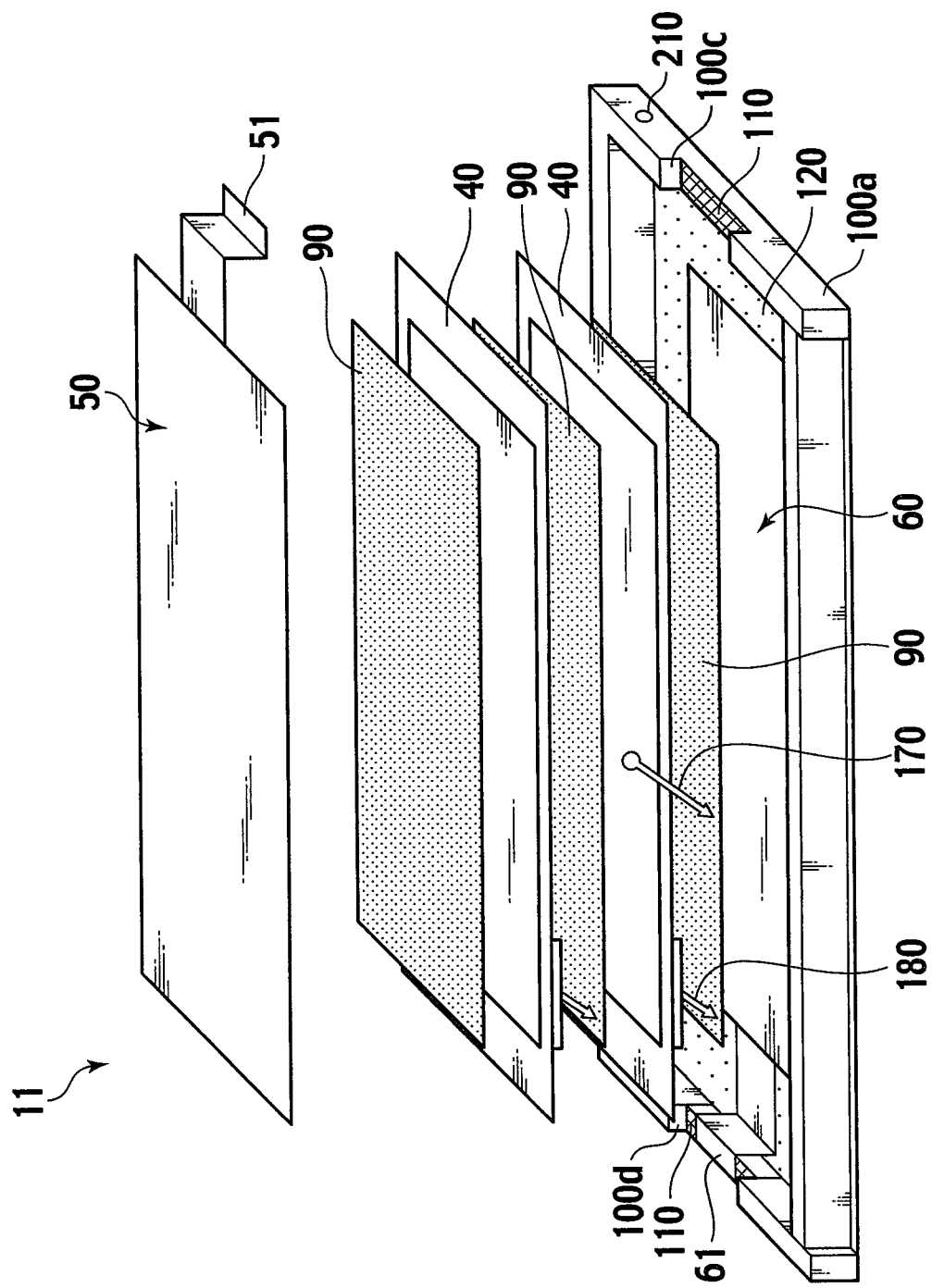
FIG. 12 is a perspective view illustrating the inner structure of the battery module according to the second embodiment.
Figure 13:
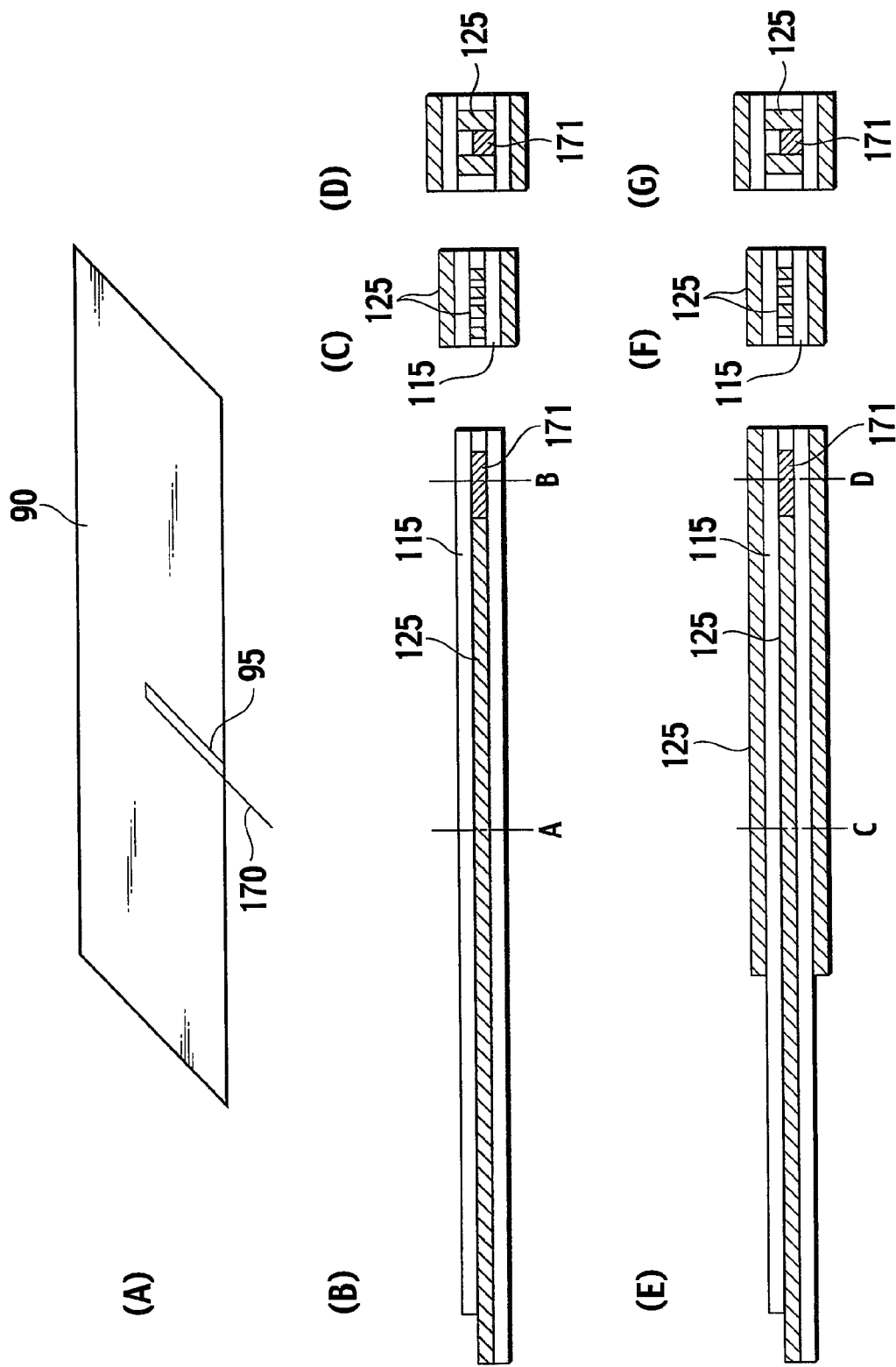
FIG. 13 shows the configuration of a sensor owned by the bipolar battery.
Figure 14:
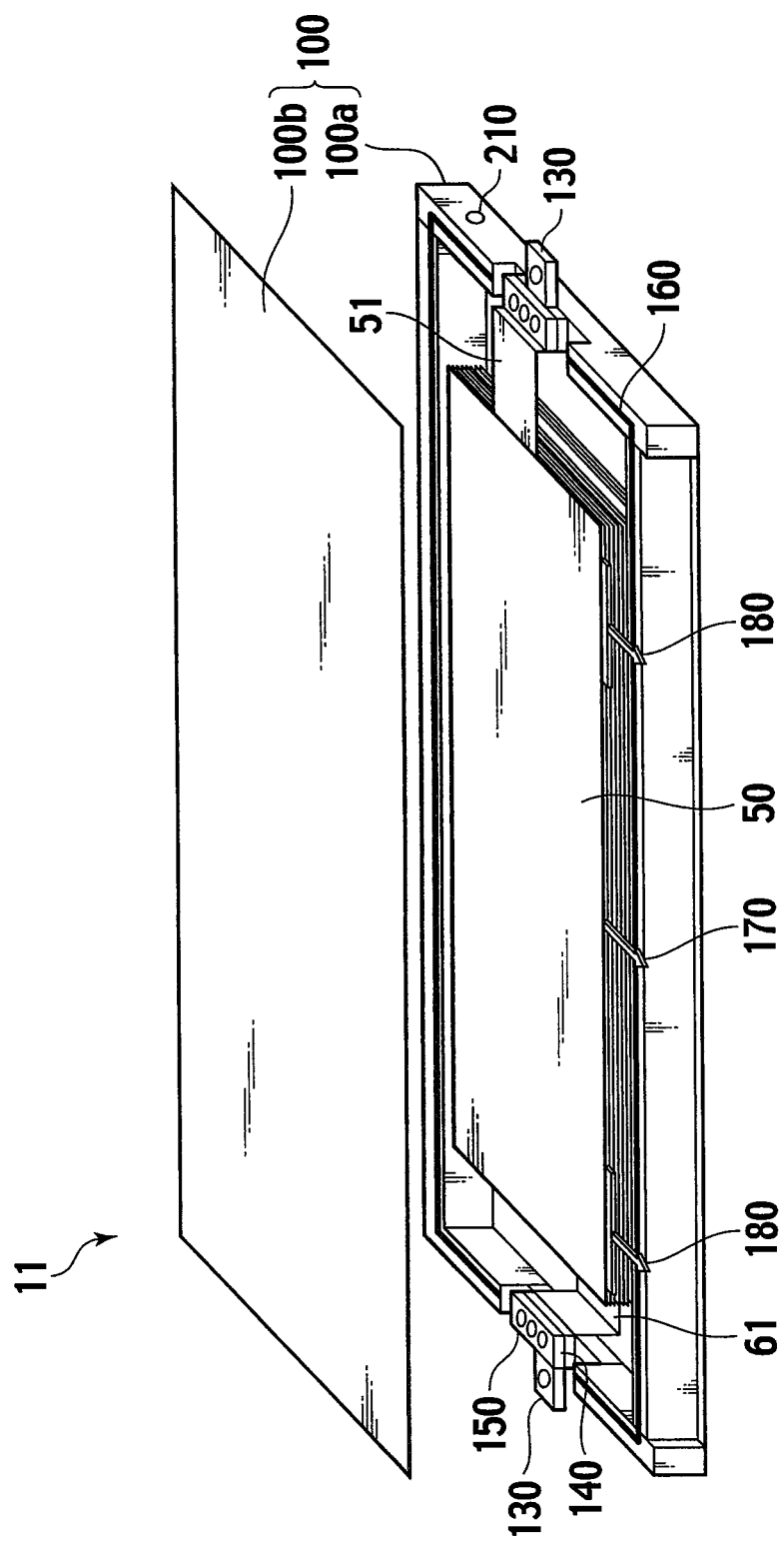
FIG. 14 is a perspective view illustrating the packaging case accommodating the bipolar battery, the elastic member, and the electrode tab for example.
Figure 15:
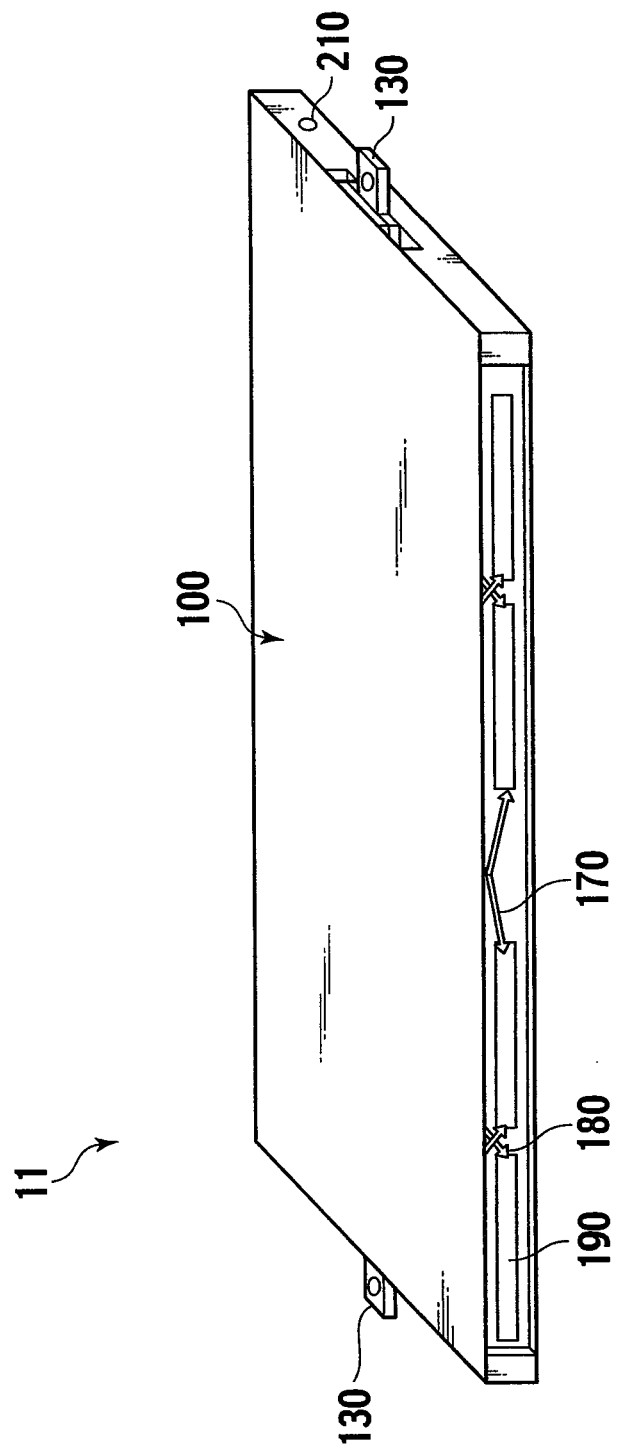
FIG. 15 is a perspective view illustrating the sealed battery module according to the second embodiment.
Figure 16:
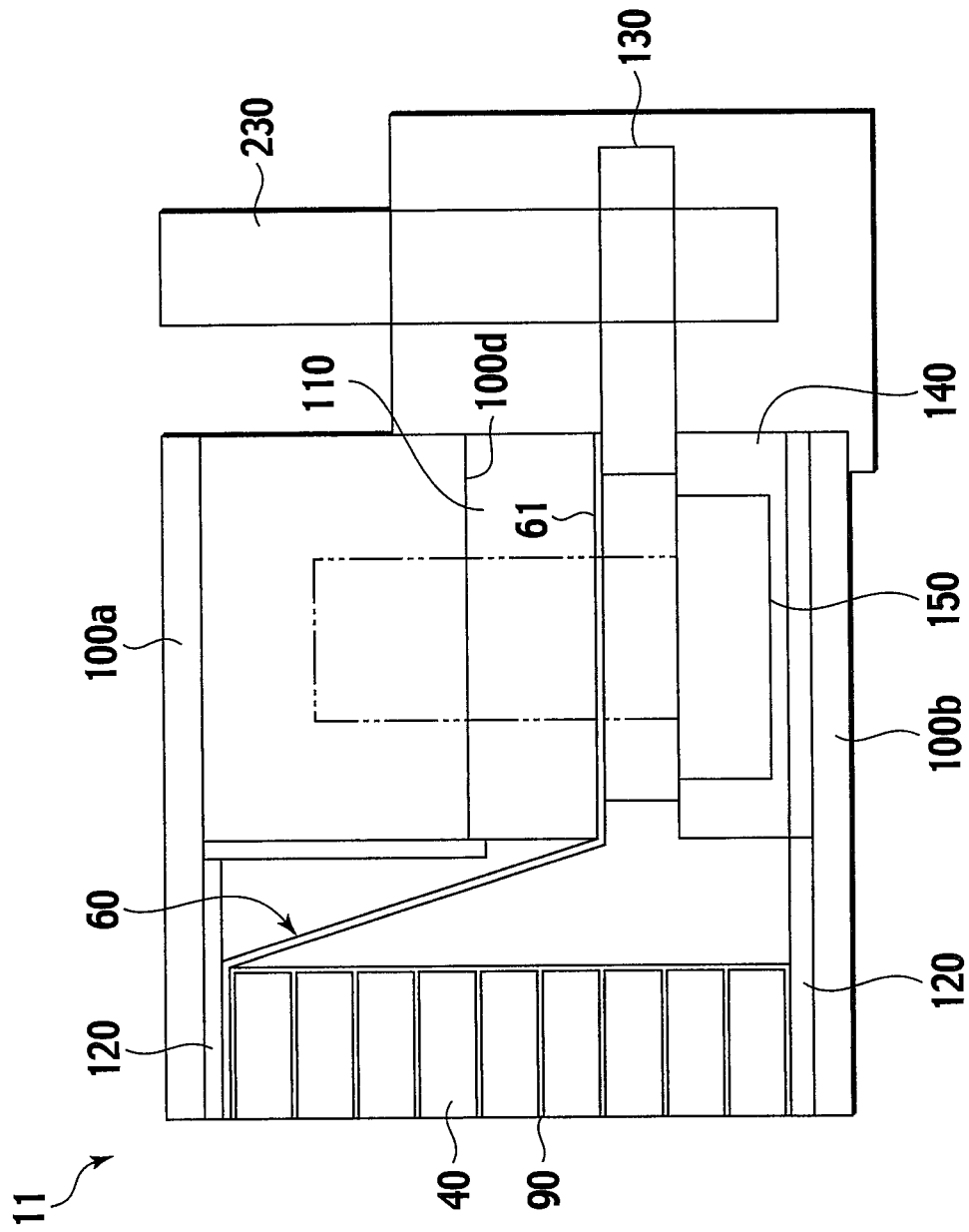
FIG. 16 is a cross-sectional view illustrating an electrode taking out part of the battery module according to the second embodiment.
Figure 17:
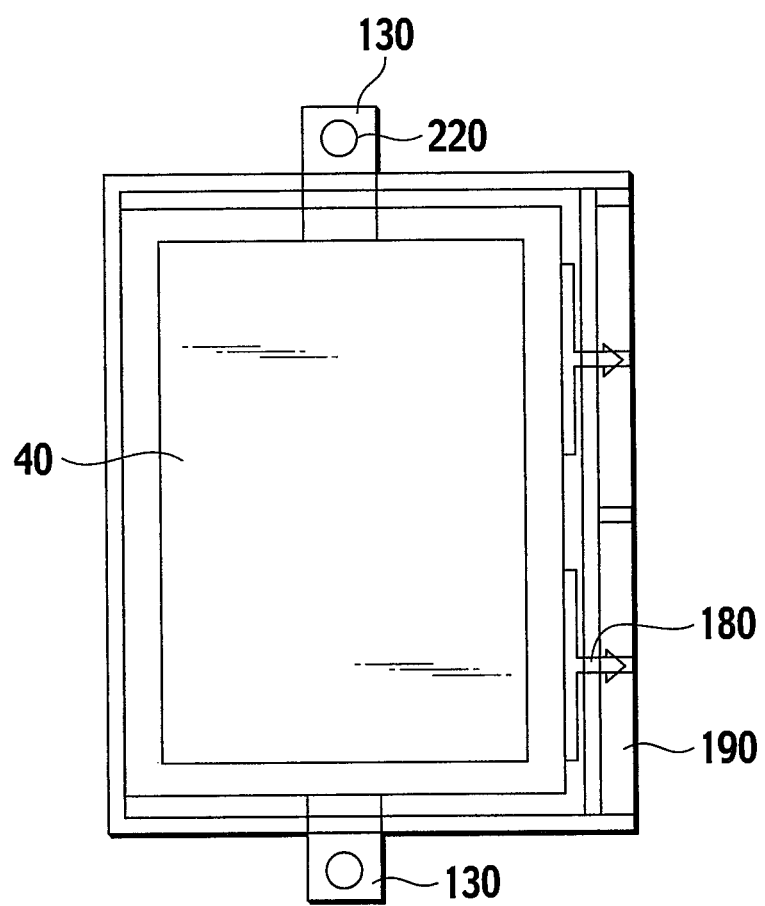
FIG. 17 is a top view illustrating the battery module according to the second embodiment.

FIG. 12 is a perspective view illustrating the inner structure of the battery module 11 according to the second embodiment. FIG. 13 shows the configuration of a sensor owned by the bipolar battery 40. FIG. 14 is a perspective view illustrating a packaging case 100 storing therein the bipolar battery 40, the electron-conductive elastic member 90, and the electrode tabs 50 and 60 for example. FIG. 15 is a perspective view illustrating the sealed battery module 11 according to the second embodiment. FIG. 16 is a cross-sectional view illustrating an electrode taking out part of the battery module 11 according to the second embodiment. FIG. 17 is a top view illustrating the battery module 11 according to the second embodiment.

With reference to FIG. 12 to FIG. 14, the bipolar battery group that has the layered structure via the electron-conductive elastic member 90 as described above and that has the electrode tabs 50 and 60 at both sides in the layered direction is stored in the packaging case 100 made of metal such as aluminum. This packaging case 100 is a flat-type hollow rectangular parallelepiped-shaped metal container consisting of a box-like storage section 100a and a flat-plate-type cover body 100b covering the opening thereof. The storage section 100a is engaged with the cover body 100b by a fastening means such as a screw or an engagement means such as caulking for example. At the center of the side walls of the short sides positioned at both sides in the longitudinal direction of the storage section 100a, electrode insertion sections 100c and 100d for placing electrode-taking-out sections 51 and 61 of the electrode tabs 50 and 60 are provided. The electrode insertion sections 100c and 100d are formed by a rectangular notch having a concave shape toward the bottom face.

In FIG. 12, the positive electrode tab 50 shown at the upper side is layered with the positive electrode of the highest bipolar battery 40 via the electron-conductive elastic member 90. The negative electrode tab 60 shown at the lower side is layered with the negative electrode of the lowest bipolar battery 40 via the electron-conductive elastic member 90. The respective electrode tabs 50 and 60 have the electrode-taking-out sections 51 and 61 through which an electrode is taken out from the packaging case 100 to the outside. The electrode-taking-out section 51 of the positive electrode tab 50 in FIG. 12 extends to the right side in the face direction and is then bent to the lower side in the layered direction and is bent to the right side in the face direction again so as to be positioned above the electrode insertion section 100c of the storage section 100a. On the other hand, the electrode-taking-out section 61 of the negative electrode tab 60 in FIG. 12 extends to the left side in the face direction and is then bent to the upper side in the layered direction and is bent to the left side in the face direction again so as to be positioned above the electrode insertion section 100d of the storage section 100a.

In this embodiment, the packaging case 100 is made of metal as described above. Thus, the electrode insertion sections 100c and 100d of the storage section 100a have thereon insulating films 110. Sheet-like elastic members 120 are provided between the bottom face of the storage section 100a and the negative electrode tab 60 and between the inner face of the cover body 100b and the positive electrode tab 50, respectively. Since the packaging case 100 is made of metal, the elastic member 120 is similarly made by insulating material such as a rubber sheet. This can prevent the positive electrode tab 50 and the negative electrode tab 60 from having short-circuiting via the metal packaging case 100.

The existence of the sheet-like elastic members 120 between the inner face of the packaging case 100 and the flat-plate-type electrode tabs 50 and 60 allows, by merely storing the bipolar battery group and the electrode tabs 50 and 60 layered via the electron-conductive elastic member 90 in the packaging case 100, the elastic force of the elastic member 120 to cause the electrode tabs 50 and 60 to be abutted to the current-taking-out plane of the bipolar battery group, thus depressing the electric generation elements of the respective bipolar batteries 40. Thus, batteries constituting an electric generation element can have a face contact to be electrically connected to each other. A need to introduce a terminal from the packaging case 100 to the outside also can be eliminated. A need for an operation to weld terminals also can be eliminated. Thus, a series of manufacture operation can be reduced to easily fabricate the battery module 11.

Inside the packaging case 100, the bipolar battery group repeatedly expands and contracts due to a temperature change due to charge and discharge. As described above, the upper and lower electrode-extracting faces of the bipolar battery group have a face contact with the positive electrode tab 50 and the negative electrode tab 60 via the electron-conductive elastic member 90 to have electrical connection therebetween. Specifically, the inner face of the packaging case 100 and the electrode tabs 50 and 60 have therebetween an elastic member 120. Thus, the electric conductivity between the bipolar battery 40 and the electrode tabs 50 and 60 can be maintained in the packaging case 100 while accommodating the expansion and contraction of the bipolar battery group. The existence of the sheet-like elastic member 120 between the inner face of the packaging case 100 and the electrode tabs 50 and 60 as described above can provide a pressing force to the electric generation element of the bipolar battery group. Thus, as described above, the electron-conductive elastic member 90 provided between the bipolar batteries 40 and the electron-conductive elastic member 90 provided between the electrode-extracting face of the bipolar battery group and the electrode tabs 50 and 60 can be closely attached to the collector 22 having a minute uneven shape, thus providing a favorable uniform electrical contact.

In order to mitigate the contact resistance between the electrode-extracting face of bipolar battery group and the electrode tabs 50 and 60, a predetermined pressure must be applied from the elastic member 120 to the electrode tabs 50 and 60. Specifically, the elastic member 120 must have an elastic force that can apply a predetermined pressure to a part at which the electrode-extracting face of the bipolar battery group has a contact with the electrode tabs 50 and 60 when the bipolar battery group minimally contracts (when the bipolar battery group has a thickness at which the bipolar battery group maximally contracts). This predetermined pressure is a pressure that is obtained, when the elastic member 120 is a rubber sheet having a Young's modulus (elasticity coefficient) of 1 MPa and a thickness of 1 mm, by setting a gap of about 990 um between the inner face of the packaging case 100 and the electrode tabs 50 and 60 for example. The use of the sheet-like (flat-plate-type) elastic member 120 can accommodate the uneven shape of the flat-type bipolar battery 40 to apply a uniform pressure.

The elastic member 120 preferably has a thickness that can accommodate the thermal expansion of the bipolar battery group in the layered direction so that, when the bipolar battery group has the maximum expansion (when the bipolar battery group has a thickness at which the bipolar battery group maximally expands), a pressing force that does not cause a load on the seal section 30 of the bipolar battery 40 can be maintained. When the battery module 11 includes the bipolar battery 40 as in this embodiment, leakage from the electrolyte layer 25 between the bipolar electrodes 21 must be considered. The reason is that the application of a more-than-required pressing force may cause a load to the seal section 30 to cause liquid leakage. Thus, the elastic member 120 may have a thickness determined based on the elasticity coefficient of the material, the minimum pressure required to maintain the electrical conductivity, and the maximum pressure to protect the seal section 30. The elastic member 120 having a thickness that can accommodate the expansion of the bipolar battery group in the layered direction can alleviate the stress caused by a temperature change and a difference between thermal expansion coefficients to reduce the deterioration due to distortion or metallic fatigue for example.

The elastic member 120 preferably has a friction coefficient by which the bipolar battery group is prevented from being moved in the packaging case 100 when the elastic member 120 receives repeated stress such as vibration or an impact. As a result, when the battery module 11 is provided in an electric vehicle for example and the elastic member 120 receives repeated stress such as vibration or an impact, the bipolar battery group can be prevented from being moved in the packaging case 100, thus avoiding the failure of the battery. The elastic member 120 preferably can radiate heat to the packaging case 100.

As shown in FIG. 12, by providing a temperature sensor wiring 170 between the positive electrode tab 50 or the negative electrode tab 60 and the electron-conductive elastic member 90, the temperature at the center of the battery can be measured. Thus, the temperature at the center of the battery can be directly measured to control the load to the battery, thereby improving the service life of the battery. The measurement of the pressure at the center of the battery also can realize the detection of an abnormality such as gas generation at an earlier stage to control the load to the battery, thereby improving the service life of the battery.

In this case, as shown in FIG. 13(A), the electron-conductive elastic member 90 preferably includes a notch (sensor storage section) 95 for storing the temperature sensor wiring 170. As shown in FIGS. 13(B) to 13(D), this temperature sensor wiring 170 is covered by an insulating body 115. Thus, current does not flow in the thickness direction of the sensor storage section 95, which causes fluctuated distribution of the current in the battery. In order to mitigate this, as shown in FIGS. 13(E) to 13(G), the upper and lower parts of the layered battery section of the sensor 171 also can be covered by the conductive material 125 to promote the flow of the current in the face direction from the periphery of the sensor storage section 95 to reduce the fluctuated current distribution, thereby providing a uniform charge-discharge distribution of the battery.

As shown in FIG. 14, the storage section 100a of the packaging case 100 stores therein the bipolar battery group and the electrode tabs 50 and 60 sandwiching the electron-conductive elastic member 90 and the electrode-taking-out sections 51 and 61 of the electrode tabs 50 and 60 are placed above the insulating film 110 of the electrode insertion sections 100c and 100d. The electrode-taking-out sections 51 and 61 have thereon a bus bar 130 consisting of a conductive metal flat plate. The bus bar 130 is fixed by a fix means 150 such as a plastic screw via the resin plate 140. The upper edge face of the side wall of the storage section 100a has a gasket 160 having a rectangular frame-like shape. Although the electrode insertion sections 100c and 100d have notches at which the gasket 160 is not provided in the shown example, a gasket 150 also may be continuously provided so as to pass above the resin plate 140 for fixing the bus bar 130. The existence of the gasket 160 between the upper edge face of the side wall of the storage section 100a and the inner face of the cover body 100b secures the sealing performance of the packaging case 100. In this embodiment, the reason why the packaging case 100 is made of metal is that the packaging case 100 has the maximum surface area having a contact with air and thus material having a small moisture permeability can be used to prevent moisture from entering the case. The temperature sensor wirings 170 and the control wirings 180 of the respective bipolar batteries 40 extend to the outside of the case so as to pass the upper face of the gasket 160. The cover body 100b is provided in which the elastic member 120 is attached so as to cover the opening of the storage section 100a and is fixed by a fastening member (not shown) such as a screw (see FIG. 15).

Next, epoxy resin is filled in the inner space of the packaging case 100. The purpose of the epoxy resin is to prevent an excessive pressure to the seal section 30 caused by a change in the internal pressure due to a change in the temperature of the gaseous matter when gaseous matter remains in the packaging case 100. The epoxy resin may be filled by firstly installing the battery module 11 in a vacuum chamber (not shown) to vacuumize the interior of the chamber to subsequently immerse the epoxy injection opening 210 of the side wall of the short side of the storage section 100b in epoxy resin fluid. Then, the interior of the chamber is caused to have an atmosphere pressure again. Then, a certain time is waited to take out the epoxy injection opening 210 from the epoxy resin fluid, thereby completing the step of filling the epoxy resin. Then, as shown in FIG. 15, one side face in the longitudinal direction of the packaging case 100 is fixed with a control substrate 190 by a fix member such as a screw. This control substrate 10 is connected with the temperature sensor wiring 170 and the control wiring 180 extending to the outer side of the case.

In the second embodiment, the bipolar battery 40 has the seal section 30 for blocking the electric cell layer 26 from outside air, thus eliminating a need to seal the battery element 20 by a packaging member. Thus, the plurality of bipolar batteries 40 are directly sandwiched between the one pair of electrode tabs 50 and 60. The battery module 11 can be formed without requiring an operation to seal individual battery elements 20 by a packaging member, thus reducing a series of operations for forming the battery module 11 using the bipolar batteries 40. Furthermore, the plurality of bipolar batteries 40 are electrically connected to one another by merely sandwiching the plurality of bipolar batteries 40 among the upper electrode tabs 50 and the lower electrode tabs 60 to store the resultant structure in the packaging case 100 via the insulating elastic member 120. Thus, the plurality of bipolar batteries 40 can be electrically connected to one another without requiring an operation to weld terminals for taking out current or to connect the plurality of bipolar batteries 40 via a connection member such as a bus bar. This also can reduce a series of operations for forming the battery module 11. Since the bipolar batteries 40 are directly connected to one another or are connected via the electron-conductive elastic member 90 without interposition of a terminal for taking out current, the battery module 11 also can have a higher output. Since the need for a packaging member or a terminal for taking out current is eliminated, the capacity of the battery module 11 can be proportionally reduced. Furthermore, current can be taken out by merely sandwiching and retaining the plurality of bipolar batteries 40 between the upper electrode tab 50 and the lower electrode tab 60, thus simplifying the structure for taking out current. As described above, the battery module 11 has a structure using the advantage of the bipolar battery 40 according to which current flows in the layered direction in the battery element 20, thus simplifying the formation of the battery module 11 using the bipolar battery 40.

Specifically, according to the battery module 11 of the second embodiment, the retention of the respective bipolar batteries 40 and the protection of the battery from moisture are achieved and a series of operations to insulate a control terminal and to take out a control terminal from the sealing structure can be reduced. Thus, a low-cost assembled battery having a small volume can be provided.

The plurality of bipolar batteries 40 are serially electrically connected to one another. Thus, the number of the serially-connected bipolar batteries 40 can be merely changed to easily satisfy an output-related requirement.

The bipolar battery 40 may be made of known materials used for general lithium ion secondary batteries except for the particularly-described materials and materials for the bipolar battery 40 are not limited to a particular one. The following section will describe a collector, a positive electrode active material layer, a negative electrode active material layer, and an electrolyte layer for example that can be used for the bipolar battery 40.

(Collector)

Collectors that can be used in this embodiment are not limited to a particular one and may be conventionally-known ones. Collectors that can be used in this embodiment may be preferably made of, for example, aluminum foil, stainless foil, clad material of nickel and aluminum, clad material of copper and aluminum, and plating material by a combination of these metals. A collector obtained by covering the surface of metal with aluminum also may be used. Depending on a case, a collector obtained by adhering two or more metal foils also may be used. A collector made by an aluminum foil is preferred because the collector can have a corrosion resistance, can be easily manufactured, and can be economically efficient for example.

The thickness of the collector is not limited to a particular one but may be in a range from about 1 μm to about 100 μm.

(Positive Electrode Active Material Layer)

A positive electrode includes positive electrode active material. A positive electrode also may include conductivity auxiliary agent and binder for example. Such material chemically or physically cross-links to sufficiently permeate a positive electrode and a negative electrode as gel electrolyte.

Positive electrode active material can be composite oxide of transition metal and lithium that is used for a solution-base lithium ion battery. Specifically, positive electrode active material may be Li.Co-base composite oxide such as $LiCoO_2$, a Li.Ni-base composite oxide such as $LiNiO_2$, a Li.Mn-base composite oxide such as spinel $LiMn_2O_4$, an Li.Fe-base composite oxide such as $LiFeO_2$ for example. In addition, positive electrode active material also may be and phosphate compound sulfated compound of transition metal and lithium such as $LiFePO_4$; transition metal oxide and sulfide such as $V_2O_5$, $MnO_2$, $TiS_2$, $MOS_2$, $MOO_3$; and $PbO_2$, AgO, and NiOOH for example.

The positive electrode active material may have a particle diameter by which a manufacture method is used to form paste-like positive electrode material to form the film by spray coating for example. In order to further reduce the electrode resistance of the bipolar battery, such positive electrode active material is preferably used that has a particle diameter smaller than that of conventional use and the diameter is generally used for a solution-type lithium ion battery that has not-solid electrolyte. Specifically, the positive electrode active material preferably has an average particle diameter of 0.1 μm to 10 μm.

High polymer gel electrolyte is obtained by providing electrolysis solution generally used in a lithium ion battery in ion-conductive solid high polymer electrolyte. High polymer gel electrolyte also may be the one obtained by providing the similar electrolysis solution in the skeleton of the high polymer not having a lithium ion conductivity.

Electrolysis solution (electrolyte salt and plasticizer) included in high polymer gel electrolyte may be the one generally used in a lithium ion battery, including, for example, at least one type of lithium salt (electrolyte salt) that is selected from among inorganic acid anion salt (e.g., $LiPF_6$, $LiBF_4$, $LiClO_4$, $LiAsF_6$, $LiTaF_6$, $LiAlCl_4$, $Li_2B_{10}Cl_{10}$) and organic acid anion salt (e.g., $LiCF_3SO_3$, $Li(CF_3SO_2)_2N$, $Li(C_2F_5SO_2)_2N$), and organic solvent (plasticizer) such as aprotic solvent that is obtained by mixing one or two or more selected from among cyclic carbonates (e.g., propylene carbonate, ethylene carbonate), chain carbonates (e.g., dimethyl carbonate, methylethyl carbonate, diethyl carbonate), ethers (e.g., tetrahydrofuran, 2-methyltetrahydrofuran, 1,4-dioxane, 1,2-dimethoxyethane, 1,2-dibutoxyethane), lactones (e.g., y-butyrolactone), nitriles (e.g., acetonitrile), esters (e.g., methyl propionate), amides (e.g., dimethyl formamide), methyl acetate, and methyl formate. However, the invention is not limited to them.

Ion-conductive high polymer includes polyethylene oxide (PEO), polypropylene oxide (PPO), and the copolymer thereof for example.

Not-lithium-ion-conductive high polymer used for high polymer gel electrolyte may be, for example, PolyVinylidine DiFluoride (PVDF), polyvinyl chloride (PVC), polyacrylonitrile (PAN), and polymethyl methacrylate (PMMA) for example. However, the invention is not limited to them. PAN and PMMA for example are substance that is substantially not ion-conductive. Thus, PAN and PMMA are illustrated as not-lithium-ion-conductive high polymer used for high polymer gel electrolyte, although PAN and PMMA also may be assumed as ion-conductive high polymer.

The above lithium salt may be, for example, inorganic acid anion salt (e.g., $LiPF_6$, $LiBF_4$, $LiClO_4$, $LiAsF_6$, $LiTaF_6$, $LiAlCl_4$, $Li_2B_{10}Cl_{10}$) and organic acid anion salt (e.g., $Li(CF_3SO_2)_2N$, $Li(C_2F_5SO_2)_2N$), or the mixture thereof for example. However, the invention is not limited to them.

Conductivity auxiliary agent may be acetylene black, carbon black, and graphite for example. However, the invention is not limited to them.

In this embodiment, these electrolyte, lithium salt, and high polymer (polymer) are mixed to prepare pre gel solution to impregnate the gel in the positive electrode and the negative electrode.

Amounts of positive electrode active material, conductivity auxiliary agent, and binder blended in the positive electrode should be determined based on an intended purpose of the battery (e.g., importance on the output or energy) and the ion-conductivity. For example, an excessively-small amount of electrolyte (solid high polymer electrolyte in particular) blended in the positive electrode causes increased ion-conductivity resistance and ion diffusion resistance in the active material layer, thus causing a deteriorated battery performance. An excessively-large amount of electrolyte (solid high polymer electrolyte in particular) blended in the positive electrode on the other hand causes a deteriorated energy density of the battery. Thus, an amount of solid high polymer electrolyte should be determined in consideration of these factors.

The thickness of the positive electrode is not limited to a particular one. As described for the blending amount, the thickness of the positive electrode also should be determined in consideration of the intended purpose of the battery (e.g., importance on output or energy) and the ion-conductivity. A general positive electrode active material layer has a thickness of about 10 to 500 μm.

(Negative Electrode Active Material Layer)

A negative electrode includes a negative electrode active material. A negative electrode also may include conductivity auxiliary agent and binder for example. The same description for the "positive electrode" basically applies to the negative electrode except for the types of negative electrode active materials. Thus, the negative electrode will not be further described.

Negative electrode active material may be the one also used for a solution-base lithium ion battery. For example, preferred negative electrode active materials include metal oxide, lithium-metal composite oxide metal, and carbon for example. More preferred negative electrode active materials include carbon, transition metal oxide, and lithium-transition metal composite oxide. Further preferred negative electrode active materials include titanium oxide, lithium-titanium composite oxide, and carbon. One of these materials may be separately used or two or more of these materials also may be used together.

In this embodiment, the positive electrode active material layer includes lithium-transition metal composite oxide as positive electrode active material. The negative electrode active material layer includes carbon or lithium-transition metal composite oxide as negative electrode active material. The reason is that these materials can constitute a battery having superior capacity and output characteristic.

(Electrolyte Layer)

An electrolyte layer is a layer composed of ion-conductive high polymer and may be composed of any material so long as the material is ion-conductive.

The electrolyte of this embodiment is high polymer gel electrolyte that is obtained by impregnating pre gel solution as a base in separator to subsequently chemically cross-link or physically cross-link the solution with the separator to provide high polymer gel electrolyte.

The high polymer gel electrolyte as described above is provided by including electrolyte generally used in a lithium ion battery in ion-conductive perfect solid high polymer electrolyte (e.g., polyethylene oxide (PEO)). The high polymer gel electrolyte also includes the one in which the similar electrolyte is retained in the skeleton of not-lithium-ion-conductive high polymer (e.g., PolyVinylidine DiFluoride (PVDF)). These are the same as the high polymer gel electrolyte described as one of electrolytes included in the positive electrode and thus will not be described further. A wide range of proportions between polymer and electrolyte constituting the high polymer gel electrolyte may be used. For example, when 100% of polymer is used as the perfect solid high polymer electrolyte and 100% of electrolyte is used as the liquid electrolyte, the intermediates thereof are all the high polymer gel electrolyte. The term "polymer electrolyte" herein includes both of the high polymer gel electrolyte and the perfect solid high polymer electrolyte.

The high polymer gel electrolyte may be included not only in the high polymer electrolyte constituting a battery but also in a positive electrode and/or a negative electrode as described above. However, a different high polymer electrolyte may be used depending on the high polymer electrolyte, the positive electrode, and the negative electrode constituting the battery, the same high polymer electrolyte may be used, or different high polymer electrolytes depending on the respective layers also may be used.

The thickness of the electrolyte constituting the battery is not limited to a particular one. However, in order to obtain a compact bipolar battery, the thickness of the electrolyte is preferably minimized in a range within which the function of the electrolyte can be secured. The thickness of the solid high polymer electrolyte layer is generally in a range from about 10 to 100 μm. However, a characteristic of the manufacture method also can be used to shape the electrolyte so as to also cover the upper face of the electrode (positive electrode or negative electrode) and the outer periphery of the side face. Thus, the thickness of the electrolyte is not always required to be fixed in consideration of the function and performance regardless of a part at which the electrolyte is provided.

The electrolyte layer also can be made of solid electrolyte. The reason is that the use of solid electrolyte can prevent liquid leakage to prevent the short-circuiting (liquid junction), which is a unique disadvantage to the bipolar battery, thus providing a reliable bipolar battery. The prevention of liquid leakage also can provide a simpler structure to the seal section 30.

The solid electrolyte may be known solid high polymer electrolyte such as polyethylene oxide (PEO), polypropylene oxide (PPO), and the copolymer thereof. The solid high polymer electrolyte layer includes supporting salt (lithium salt) in order to secure the ion-conductivity. Supporting salt may be $LiBF_4$, $LiPF_6$, $LiN(SO_2CF_3)_2$, $LiN(SO_2C_2F_5)_2$, or the mixture thereof for example. However, the invention is not limited to them. Polyalkylene oxide-base high polymer such as PEO or PPO may allow lithium salt such as $LiBF_4$, $LiPF_6$, $LiN(SO_2CF_3)_2$, $LiN(SO_2CF_5)_2$ to be well dissolved and also provides a cross-linked structure, thus realizing a superior mechanical strength.

(Third Embodiment)

Figure 18:
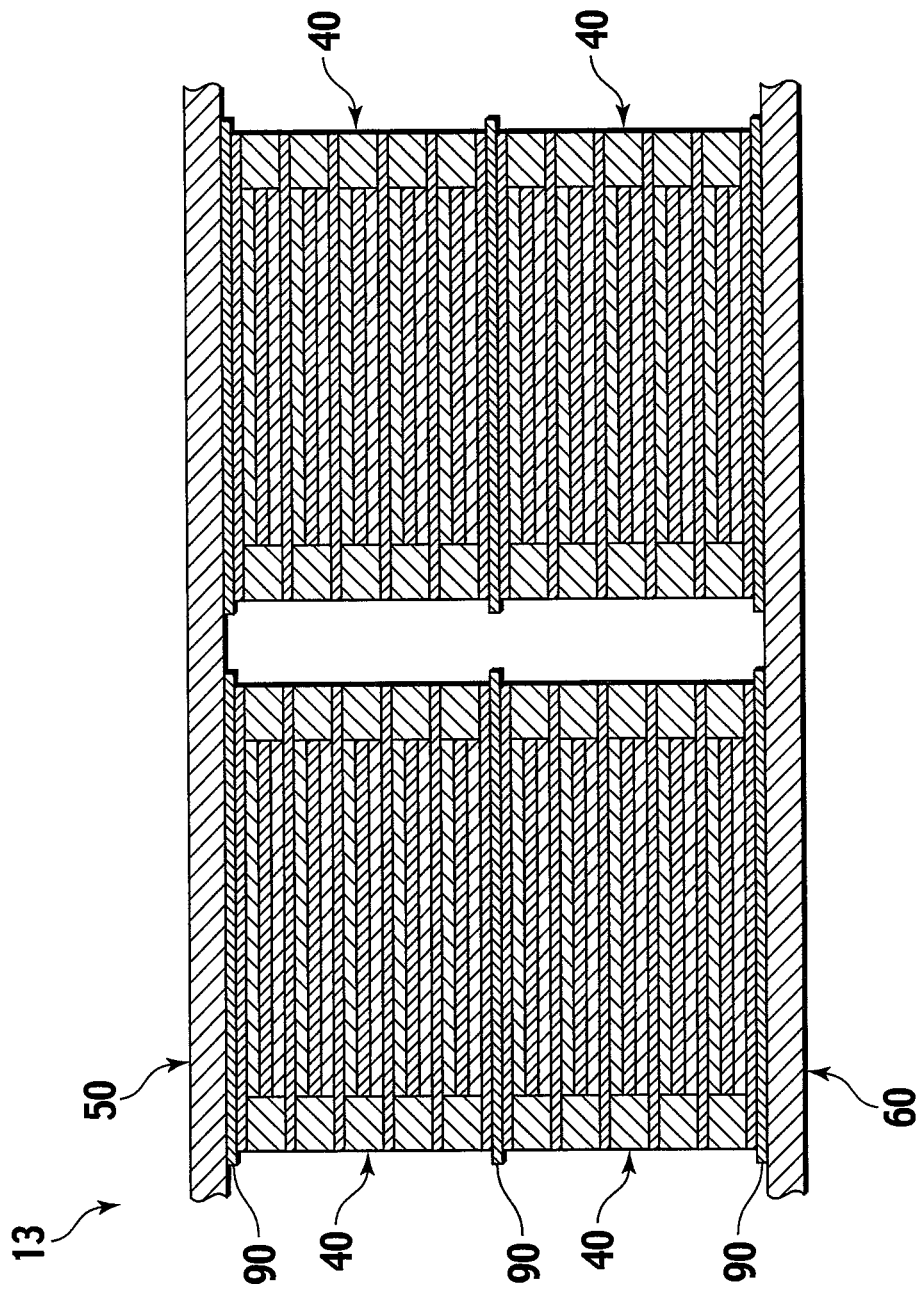
FIG. 18 is a cross-sectional view illustrating a layered structure of a battery module according to the third embodiment.

With reference to FIG. 18, the battery module 13 of the third embodiment has a structure in which two battery groups obtained by layering the two bipolar batteries 40 in the up-and-down direction to electrically serially connect the bipolar batteries 40 are arranged in a direction orthogonal to the layered direction of the bipolar electrode 21. The two battery groups are arranged so as to have the same electrical polarity (the upper side in FIG. 18 is the positive electrode and the lower side is the negative electrode) and are electrically parallelly connected via the upper electrode tab 50 and the lower electrode tab 60. This electrical connecting formation is called "two parallel×two serial".

In the third embodiment, the bipolar batteries 40 are electrically connected in a series-parallel manner. Thus, a requirement related to the output and capacity can be satisfied easily by merely changing the number of the bipolar batteries 40 to be serially connected and the number of the bipolar batteries 40 to be parallely connected.

(Fourth Embodiment)

Figure 19:
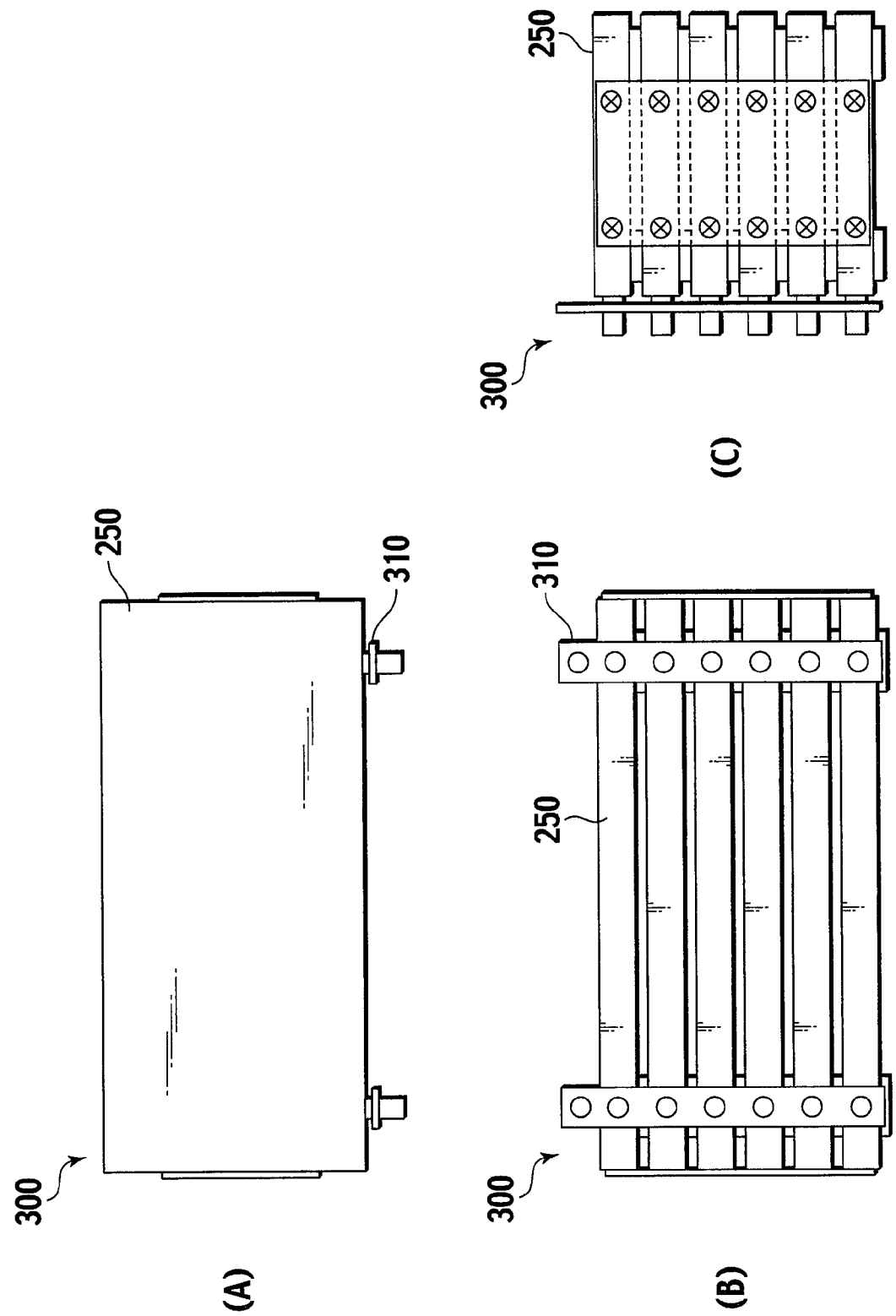
FIG. 19 is a schematic view illustrating the structure of an assembled battery according to the fourth embodiment.

The battery modules 11 (13) also can be serially or parallely connected to form an assembled battery module 250 (see FIG. 19) and the assembled battery modules 250 can be further serially or parallely connected to form an assembled battery 300. The shown assembled battery module 250 is obtained by layering the battery modules 11 to store the battery modules 11 in the module case to parallely connect the respective battery modules 11. The bus bar 130 at the positive electrode side or at the negative electrode side is connected into a connection hole 220 via a conducting bar 230, respectively. FIG. 19A is a top view illustrating the assembled battery 300 according to the fourth embodiment of the present invention. FIG. 19B is the front view thereof. FIG. 19C is the side view thereof. The prepared assembled battery modules 250 are connected to one another by an electric connection means such as a bus bar. The assembled battery modules 250 are layered to form a plurality of layers by a connection 310. The number of the battery modules 11 connected to form the assembled battery module 250 or the number of layers of the assembled batteries module 250 layered to form the assembled battery 300 may be determined based on the battery capacity or the output of a vehicle (electric vehicle) in which the batteries are installed.

According to the fourth embodiment, the battery modules 11 parallely connected to form an assembled battery can provide a battery having a high capacity and a high output. Furthermore, the respective battery modules 11 using the bipolar batteries 40 have the advantageous and easy-to-manufacture structure of the bipolar battery 40 according to which current flows in the battery element 20 in the layered direction. Through this structure, the assembled battery 300 also can be easily formed in which the battery modules 11 are electrically connected to one another. Since the battery module 11 has a long life and is reliable, the assembled battery 300 also has a long life and is reliable. Even if one of the assembled battery modules 250 fails, only the assembled battery module can be exchanged with a new one to complete the repair work.

(Fifth Embodiment)

Figure 20:
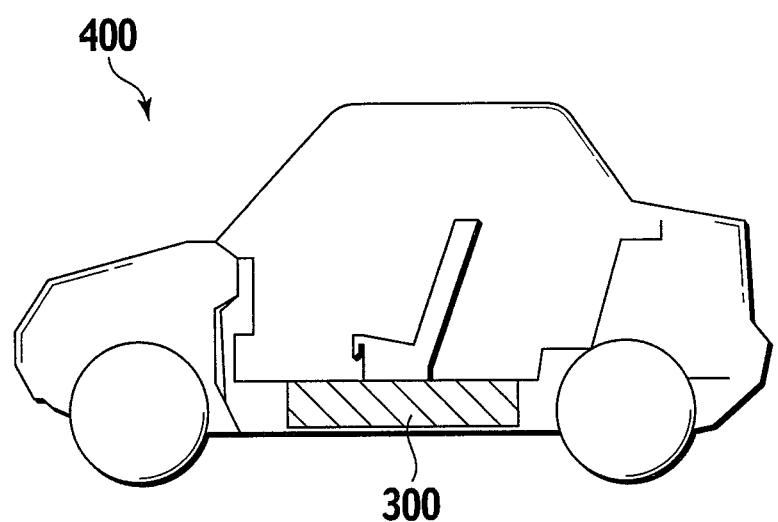
FIG. 20 illustrates an assembled battery according to the fifth embodiment provided in a vehicle.

FIG. 20 is a schematic view illustrating the structure of an automobile 400 as a vehicle according to the fifth embodiment of the present invention. The above-described battery module 11(13) and/or assembled battery 300 can be provided in a vehicle such as an automobile or an electric train and can be used for a power source for driving an electric device such as a motor. As described above, the battery module 11 and/or assembled battery 300 can be formed easily. Thus, the driving power source provided in the vehicle can be formed easily.

In order to provide the assembled battery 300 in an electric vehicle 400, the assembled battery 300 is provided under a seat of the electric vehicle 400 at the center of the vehicle body, as shown in FIG. 20. The reason is that the assembled battery 300 provided under the seat can increase the in-vehicle space and trunk room. The position at which the assembled battery 300 is provided is not limited to the position under the seat. The assembled battery 300 also may be provided under a rear trunk room or under an engine room at the front side of the vehicle. The electric vehicle 400 using the assembled battery 300 as described above has a high durability and can provide a sufficient output even when being used for a long period of time. Further, an electric vehicle and a hybrid automobile having superior fuel consumption and travelling performance can be provided.

In the present invention, in addition to the assembled battery 300, only the assembled battery module 250 also may be provided depending on an application or a combination of the assembled battery 300 and the assembled battery module 250 also may be provided. The assembled battery or the assembled battery module of the present invention is preferably provided in the above electric vehicle or hybrid vehicle. However, the invention is not limited to them.

Illustrative Embodiments

Effects in the respective configurations of mitigating vibration when vibration is applied to the battery modules having the respective configurations shown in Embodiment 1 were evaluated through experiments.

First, a flat plate battery was prepared in the manner as described below.

Positive Electrode Material

The following materials were mixed with a predetermined ratio to fabricate positive electrode material.

Slurry was fabricated by using positive electrode active material of $LiMn_2O_4$ (85 wt %), conductivity auxiliary agent of acetylene black (5 wt %), and binder of PVDF (10 wt %), and by adding slurry viscosity control solvent of NMP to the mixture the viscosity for a coating process was controlled. A collector of stainless having a thickness of 15 μm was used and the above slurry was coated on one surface and dried, thereby fabricating a positive electrode.

Negative Electrode Material

The following materials were mixed with a predetermined ratio to fabricate a negative electrode material.

Slurry was fabricated by using negative electrode active material of hard carbon (90 wt %) and binder of PVDF (10 wt %), and by adding slurry viscosity control solvent of NMP to the mixture the viscosity for a coating process was controlled. Then, the above slurry was coated on the other surface of the collector in which the one surface was already coated with the positive electrode active material. Then, the slurry was dried, thereby completing a flat-type battery electrode having a structure in which one surface of the stainless collector was coated with the positive electrode and the other surface was coated with the negative electrode. Thereafter, the flat-type battery electrode was cut to have a size of 140×90 mm and the periphery having a width of 10 mm from the electrode was not coated with a positive or negative electrode, thus fabricating the flat-type battery electrode having the 120×70 electrode section and the seal margin of 10 mm at the periphery.

Electrolyte Material

The following materials were mixed with a predetermined ratio to fabricate electrolyte material.

Electrolyte was prepared by using electrolysis solution of PC-EC 1ML$iPF_6$ (90 wt %), host polymer of PvdF-HFP (10 wt %) including 10% HFP copolymer, and viscosity preparation solvent of DMC. This electrolyte was coated on a positive electrode and a negative electrode at both surfaces to dry DMC, thereby completing a bipolar-type electrode to which gel electrolyte permeates.

Formation of Gel Electrolysis Layer

The electrolyte material was coated on both surfaces of a polypropylene-made porous film separator of 20 μm to dry DMC, thereby obtaining a gel polymer electrolyte layer.

Layering

The gel electrolyte layer was placed on the positive electrode of the flat-type battery electrode to place a PE-made film having a width of 12 mm was placed at the periphery as a seal member. The flat-type battery electrode as described above was layered to form five layers to subsequently press (apply heat and a pressure) the seal section from the upper and lower sides to fuse the seal section to seal the respective layers. The pressing was carried out with a pressure of 0.2 MPa for five seconds at a temperature of 160 degrees C.

An electrode tab was prepared in which an Al plate of 100 μm of a size of 130 mm×80 mm that can cover the entire projection plane of the flat-type battery partially extends to the outer side of the battery projection plane. This electrode tab sandwiches the predetermined number of flat-type batteries to sandwich the predetermined electron-conductive elastic member to use aluminum laminate to seal the batteries in vacuum with aluminum laminate to press both surfaces of the entire flat-type battery with an atmosphere pressure, thereby completing a battery module having an improved contact between the electrode tab and the flat-type battery and the flat-type batteries themselves.

(Illustrative Embodiment 1)

Figure 21:
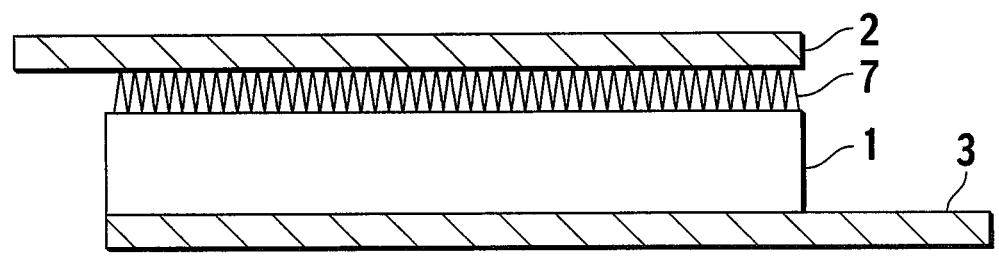
FIG. 21 illustrates the structure of a battery module according to Illustrative Embodiment 1.

In Illustrative Embodiment 1, a wave-like metal material 7 as an electron-conductive elastic member was provided between the flat-type battery 1 and the positive electrode tab 2 as shown in FIG. 21.

(Illustrative Embodiment 2)

Figure 22:
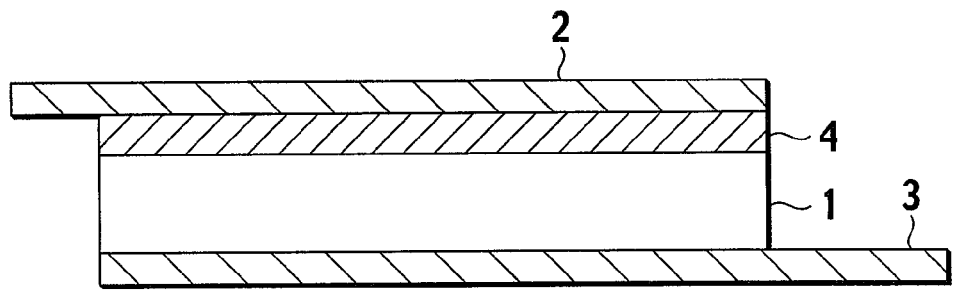
FIG. 22 illustrates the structure of a battery module according to Illustrative Embodiment 2.

In Illustrative Embodiment 2, as shown in FIG. 22, the electron-conductive elastic member 4*b* was provided between the flat plate battery 1 and the positive electrode tab 2. The electron-conductive elastic member 4*b* was made of conductive polymer material in which conductive filler of carbon material was dispersed in polypropylene (see FIG. 28(B)).

(Illustrative Embodiment 3)

Figure 23:
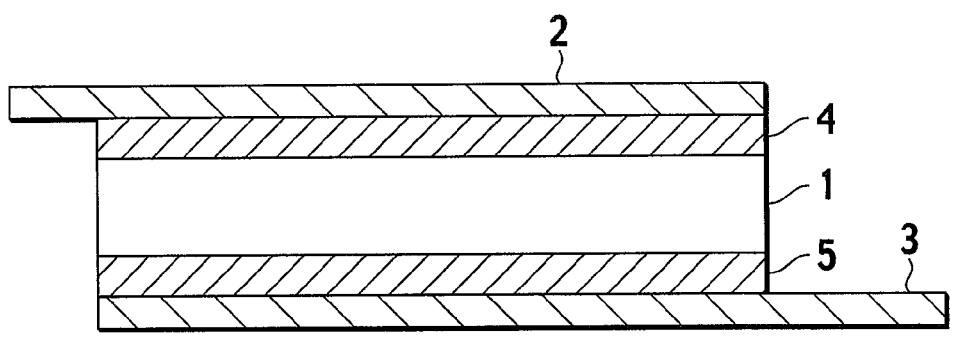
FIG. 23 illustrates the structure of a battery module according to Illustrative Embodiment 3.

In Illustrative Embodiment 3, as shown in FIG. 23, the electron-conductive elastic member 4b was provided between the flat plate battery 1 and the positive electrode tab 2 and the electron-conductive elastic member 5b was provided between the flat plate battery 1 and the negative electrode tab 3. The electron-conductive elastic member 4b was made of conductive polymer material in which conductive filler of carbon material was dispersed in polypropylene.

(Illustrative Embodiment 4)

Figure 24:
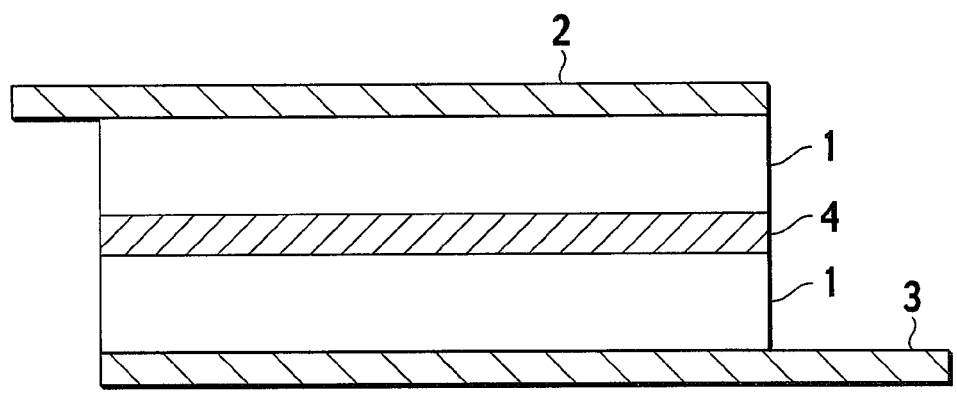
FIG. 24 illustrates the structure of a battery module according to Illustrative Embodiment 4.

In Illustrative Embodiment 4, as shown in FIG. 24, the electron-conductive elastic member 4b was provided between the flat plate battery 1 and the flat plate battery 1. The electron-conductive elastic member 4b was made of conductive polymer material in which conductive filler of carbon material was dispersed in polypropylene.

(Illustrative Embodiment 5)

Figure 25:
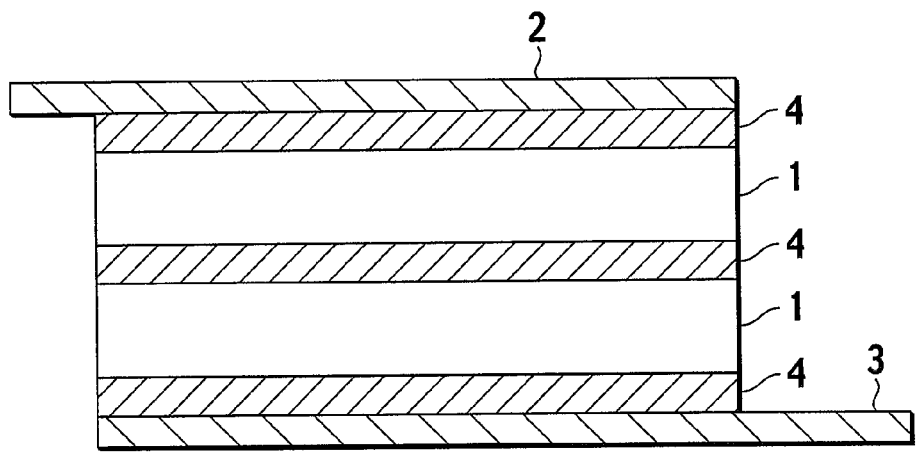
FIG. 25 illustrates the structure of a battery module according to Illustrative Embodiment 5.

In Illustrative Embodiment 5, as shown in FIG. 25, the electron-conductive elastic member 4b was provided between the flat plate battery 1 and the positive electrode tab 2. The electron-conductive elastic member 5b was provided between the flat plate battery 1 and the negative electrode tab 3. The electron-conductive elastic member 4b was also provided between the flat plate battery 1 and the flat plate battery 1. The electron-conductive elastic member 4b was made of conductive polymer material in which conductive filler of carbon material was dispersed in polypropylene.

Comparison Example 1

Figure 26:
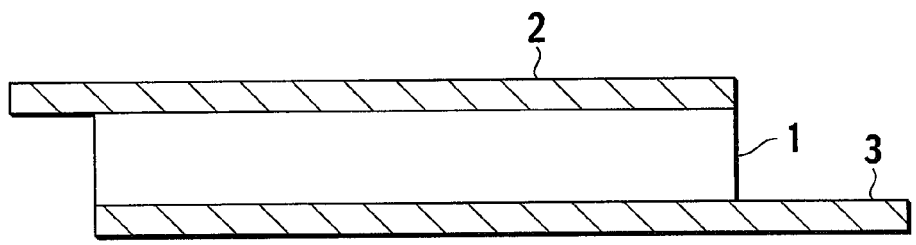
FIG. 26 illustrates the structure of a battery module according to Comparison Example 1.

In Comparison Example 1, as shown in FIG. 26, the positive electrode tab 2 and the negative electrode tab 3 were attached to the flat-type battery 1 without using elastic material at all.

Comparison Example 2

Figure 27:
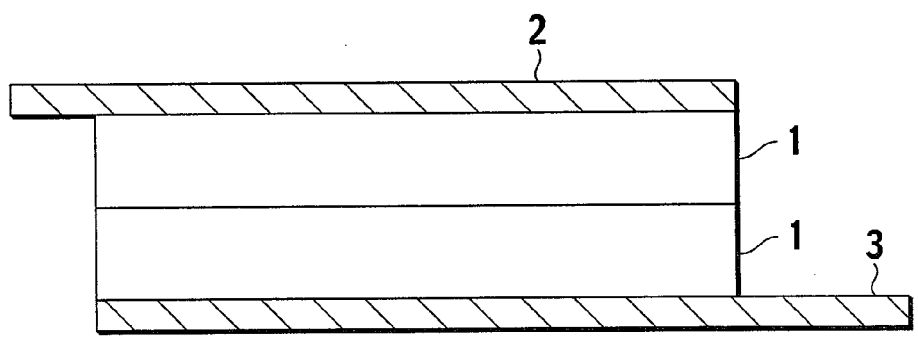
FIG. 27 illustrates the structure of a battery module according to Comparison Example 2.

In Comparison Example 2, as shown in FIG. 27, the two flat-type batteries 1 were serially connected without using elastic material at all and the positive electrode tab 2 and the negative electrode tab 3 were attached thereto.

<Evaluation>

The respective batteries of Illustrative Embodiments 1 to 5 and Comparison Examples 1 and 2 were subjected to a charge/discharge test. The experiment was carried out by performing constant current charge (CC) with current of 0.5 mA until 21.0V (42V in Illustrative Embodiments 4 and 5 and Comparison Example 2) was reached to subsequently charge (CV) the batteries with a fixed voltage to charge the batteries for the total of 10 hours.

Thereafter, vibration up to 10 to 100 Hz was always applied to the battery module with an input acceleration of 24.5 m/s$^2$ to vibrate the battery module simultaneously repeating a heat cycle at 25 degrees C. for one hour and 60 degrees C. for one hour for two weeks to subsequently carry out electric discharge to check the capacity.

Based on the assumption that the capacity prior to the vibration application is 100%, the electric discharge capacity after the vibration application was measured. The measurement result is shown in the table 1 shown below. The charge and discharge was carried out by the charge and discharge of fixed current (CC) and the full charge was assumed as 21.0V (42V in Illustrative Embodiments 4 and 5 and Comparison Example 2) and the discharge end was assumed as 12.5V (25V in Illustrative Embodiments 4 and 5 and Comparison Example 2).

<Result>

When Comparison Example 1 is compared with Illustrative Embodiments 1 and 2, the existence of the elastic member at least between the flat-type battery and one electrode tab provides the vibration isolation effect by the elastic member, as can be seen. Specifically, when the capacity maintenance rate in Comparison Example 1 after the vibration application is compared with the capacity maintenance rate in Illustrative Embodiments 1 and 2 after the vibration application, Illustrative Embodiments 1 and 2 having the elastic member shows a higher capacity maintenance rate after the vibration application, thus showing that a reduction of capacity is suppressed by the vibration isolation effect by the elastic member.

It is also found that, when compared with Illustrative Embodiment 1 merely using the wave-like metal material, Illustrative Embodiment 2 using the high polymer material that can alleviate the thermal expansion can suppress the capacity from being reduced through the vibration isolation effect.

Although the detailed mechanism through which Illustrative Embodiment 2 can suppress the capacity from being reduced than in the case of Illustrative Embodiment 1 is not clear, it may be considered that the stress between the modules during a heat cycle is accommodated by the elastic member to improve the capacity maintenance rate.

In the case of Illustrative Embodiment 3, the existence of the elastic member between the flat-type battery and both electrode tabs can absorb the vibration from the upper and lower sides of the flat plate battery, thus showing a further improved vibration isolation effect than in the case of Illustrative Embodiment 1 and Illustrative Embodiment 2. Thus, the capacity maintenance rate after the vibration application is higher than those of Illustrative Embodiment 1 and Illustrative Embodiment 2.

When Comparison Example 2 is compared with Illustrative Embodiment 4, the existence of the elastic member between the flat-type batteries shows the vibration isolation effect by the elastic member.

In the case of Illustrative Embodiment 5, the existence of the elastic members between the flat-type batteries and between both electrode tabs can absorb the vibration from the upper and lower sides of the flat plate battery, thus providing a further improved vibration isolation effect. Thus, in the case of the fifth embodiment, the capacity maintenance rate after the vibration application shows a value higher than that of any illustrative embodiment.

TABLE 1

| | THE NUMBER OF USED FLAT-TYPE ELECTRODES | ELASTIC MATERIAL | A POSITION AT WHICH ELASTIC MATERIAL IS SANDWICHED | CAPACITY MAINTENANCE RATE AFTER VIBRATION APPLICATION |
|---|---|---|---|---|
| EXAMPLE 1 | 1 | WAVE-LIKE METAL MATERIAL | BETWEEN FLAT-TYPE BATTERY AND ONE ELECTRODE TAB | 82% |
| EXAMPLE 2 | 1 | ELECTRICALLY-CONDUCTIVE HIGH POLYMER MATERIAL | BETWEEN FLAT-TYPE BATTERY AND ONE ELECTRODE TAB | 85% |

TABLE 1-continued

| | THE NUMBER OF USED FLAT-TYPE ELECTRODES | ELASTIC MATERIAL | A POSITION AT WHICH ELASTIC MATERIAL IS SANDWICHED | CAPACITY MAINTENANCE RATE AFTER VIBRATION APPLICATION |
|---|---|---|---|---|
| EXAMPLE 3 | 1 | ELECTRICALLY-CONDUCTIVE HIGH POLYMER MATERIAL | BETWEEN FLAT-TYPE BATTERY AND BOTH ELECTRODE TABS | 91% |
| EXAMPLE 4 | 2 | ELECTRICALLY-CONDUCTIVE HIGH POLYMER MATERIAL | BETWEEN FLAT-TYPE BATTERIES | 86% |
| EXAMPLE 5 | 2 | ELECTRICALLY-CONDUCTIVE HIGH POLYMER MATERIAL | BETWEEN FLAT-TYPE BATTERY AND BOTH ELECTRODE TABS AND BETWEEN FLAT-TYPE BATTERIES | 93% |
| COMPARISON EXAMPLE 1 | 1 | NO | NO | 62% |
| COMPARISON EXAMPLE 2 | 2 | NO | NO | 53% |

INDUSTRIAL APPLICABILITY

The present invention can be widely used in the field of the manufacture of the bipolar battery.

The invention claimed is:

1. A battery module, comprising:
a flat battery including a positive electrode active material layer, an electrolyte layer, and a negative electrode active material layer layered in this order in a layered direction, the flat battery having a current-taking-out surface from which electric current is taken out, the current-taking-out surface providing a major surface of the flat battery and facing in the layered direction;
a flat electrode tab having a major surface thereof opposite to the current-taking-out surface in the layered direction, the flat electrode tab having an electrode-taking-out section extending from an edge of the major surface of the flat electrode tab in a direction perpendicular to the layered direction for connection to a bus bar;
a flat electron-conductive elastic member arranged between the major surface of the flat electrode tab and the current-taking-out surface of the flat battery, the elastic member having a first major surface being in surface contact with the major surface of the flat electrode tab, and a second major surface being in surface contact with the current-taking-out surface, the second major surface of the elastic member supporting the flat battery in the direction perpendicular to the layered direction; and
a packaging case covering the flat battery, the flat electrode tab, and the electron-conductive elastic member,
wherein the battery module is installed in a vehicle and subject to vibration of the vehicle, and
wherein the elastic member has a Young's modulus in a range from 0.01 to $0.30 \times 10^{10}$ N/m$^2$.

2. The battery module according to claim 1, wherein the elastic member has an elastic force that can apply a pressure to the major surface of the flat electrode tab and the current-taking-out surface of the flat battery when the flat battery minimally contracts.

3. The battery module according to claim 1, wherein the elastic member has a thickness that may accommodate thermal expansion of the flat battery.

4. The battery module according to claim 1, wherein the elastic member has a friction coefficient by which the flat battery is prevented from being moved in the packaging case when the elastic member receives repeated stress.

5. The battery module according to claim 1, wherein the elastic member is made of electron-conductive polymer material.

6. The battery module according to claim 5, wherein the electron-conductive polymer material comprises a polymer material and a conductive filler for providing electrical conductivity.

7. The battery module according to claim 6, wherein the polymer material is polyolefin, polyester, polyimide, polyamide, PolyVinylidine DiFluoride, epoxy resin, or synthetic rubber material.

8. The battery module according to claim 6, wherein the conductive filler is made of Ag fine particles, Au fine particles, Cu fine particles, Al metal fine particles, SUS fine particles, Ti fine particles, or carbon fine particles.

9. The battery module according to claim 5, wherein the electron-conductive polymer material is a conductive polymer with the polymer material itself being conductive.

10. The battery module according to claim 9, wherein the conductive polymer is polyaniline, polypyrrole, polythiophene, polyacetylene, poly-para-phenylene, poly phenylene vinylene, polyacrylonitrile, or polyoxadiazole.

11. The battery module according to claim 1, wherein the elastic member is electron-conductive nonwoven fabric or woven fabric.

12. The battery module according to claim 1, wherein the flat battery is a bipolar battery.

13. The battery module according to claim 1, wherein the flat battery is structured by layering a plurality of bipolar batteries.

14. An assembled battery structured by connecting the battery module according to claim 1.

15. A vehicle including therein the battery module according to claim 1.

16. A battery module, comprising:
a plurality of flat batteries layered on each other in a layered direction, each of the flat batteries having, on both sides thereof in the layered direction, current-taking-out surfaces from which electric current is taken out, the current-taking-out surfaces providing major surfaces of the flat battery and facing in the layered direction;
a flat electron-conductive elastic member arranged between the current-taking-out surfaces opposite to each other in the layered direction, the elastic member having two major surfaces being in surface contact with the current-taking-out surfaces, respectively, the major surfaces of the elastic member supporting a flat battery in a direction perpendicular to the layered direction;

a flat electrode tab having a major surface thereof being in surface contact with one of the current-taking-out surfaces, the flat electrode tab having an electrode-taking-out section extending from an edge of the major surface of the flat electrode tab in the direction perpendicular to the layered direction for connection to a bus bar; and a packaging case covering the plurality of flat batteries, the flat electrode tab, and the flat electron-conductive elastic member, wherein the battery module is installed in a vehicle and subject to vibration of the vehicle, and wherein the elastic member has a Young's modulus in a range from 0.01 to $0.30 \times 10^{10}$ N/m$^2$.

17. The battery module according to claim 1, wherein the first major surface of the elastic member is parallel to the second major surface of the elastic member.

18. The battery module according to claim 16, wherein the two major surfaces of the elastic member are parallel with each other.

* * * * *